US009118481B2

(12) United States Patent
Chiarella

(10) Patent No.: US 9,118,481 B2
(45) Date of Patent: Aug. 25, 2015

(54) METHOD AND SYSTEM FOR EFFICIENTLY GENERATING A HIGH QUALITY PSEUDO-RANDOM SEQUENCE OF NUMBERS WITH EXTRAORDINARILY LONG PERIODICITY

(71) Applicant: Joseph Chiarella, Camp Hill, PA (US)

(72) Inventor: Joseph Chiarella, Camp Hill, PA (US)

(73) Assignee: COLLOID, LLC, Camp Hill, PA (US)

( * ) Notice: Subject to any disclaimer, the term of this patent is extended or adjusted under 35 U.S.C. 154(b) by 19 days.

(21) Appl. No.: 13/947,539

(22) Filed: Jul. 22, 2013

(65) Prior Publication Data

US 2013/0315388 A1    Nov. 28, 2013

Related U.S. Application Data

(62) Division of application No. 13/309,544, filed on Dec. 1, 2011, now Pat. No. 8,767,954.

(51) Int. Cl.
| | |
|---|---|
| *H04L 9/06* | (2006.01) |
| *G06F 7/58* | (2006.01) |
| *H04L 9/08* | (2006.01) |
| *H04L 9/28* | (2006.01) |
| *H04L 9/12* | (2006.01) |
| *H04L 29/06* | (2006.01) |

(52) U.S. Cl.
CPC .. *H04L 9/28* (2013.01); *G06F 7/58* (2013.01); *H04L 9/06* (2013.01); *H04L 9/0656* (2013.01); *H04L 9/0861* (2013.01); *H04L 9/12* (2013.01); *H04L 63/0428* (2013.01)

(58) Field of Classification Search
CPC ............ H04L 9/06; H04L 9/0861; G06F 7/58
USPC .............................................. 380/28; 708/250
See application file for complete search history.

(56) References Cited

U.S. PATENT DOCUMENTS

| | | | | |
|---|---|---|---|---|
| 6,578,057 | B1 * | 6/2003 | Hori .............................. | 708/200 |
| 7,263,190 | B1 * | 8/2007 | Moritz ......................... | 380/258 |
| 2003/0016823 | A1 * | 1/2003 | Chung ............................ | 380/46 |
| 2003/0115449 | A1 * | 6/2003 | Yochim ......................... | 713/153 |
| 2004/0096056 | A1 * | 5/2004 | Boren et al. .................... | 380/28 |
| 2005/0063539 | A1 * | 3/2005 | Langin-Hooper et al. ...... | 380/44 |
| 2005/0132190 | A1 * | 6/2005 | Brokenshire et al. .......... | 713/168 |
| 2006/0039558 | A1 * | 2/2006 | Morii et al. ..................... | 380/46 |
| 2006/0047735 | A1 * | 3/2006 | Nunes ........................... | 708/250 |
| 2008/0294710 | A1 * | 11/2008 | Michaels ....................... | 708/491 |
| 2009/0067618 | A1 * | 3/2009 | Kumar et al. ................... | 380/28 |
| 2010/0287225 | A1 * | 11/2010 | Dong ............................. | 708/254 |
| 2011/0123021 | A1 * | 5/2011 | Tepper ............................ | 380/44 |
| 2013/0010952 | A1 * | 1/2013 | Muise et al. .................. | 380/255 |
| 2013/0041928 | A1 * | 2/2013 | Fukunaga ..................... | 707/830 |
| 2013/0145449 | A1 * | 6/2013 | Busser et al. ..................... | 726/7 |

* cited by examiner

*Primary Examiner* — Dede Zecher
*Assistant Examiner* — Jason C Chiang
(74) *Attorney, Agent, or Firm* — Polsinelli PC; Adam C. Rehm

(57) ABSTRACT

A method for generating a practically infinite sequence of pseudo-random numbers that is indistinguishable from a true random source. The method utilizes a discrete set of prime numbers, converting each to a corresponding irrational sequence of numbers, i.e., a MIRP, and arranging said MIRPs into a MIRP Stack that extends into a practically infinite non-repeating MIRP Field, from which an even longer unique sequence of pseudo-random numbers are generated.

16 Claims, 21 Drawing Sheets

Alternative Key Stream Derivation bit block transposition

| | 8 by 8 bit matrix | (MT) matrix transposition | M T r o a n i s y p | M T + X O R (F 4) |
|---|---|---|---|---|
| M i R p B o y t e # s n | 3  00000011 | 00011011 | 1B | EF |
| | F1 11110001 | 00101101 | 2D | D9 |
| | C2 11000010 | 11110000 | F0 | 4 |
| | A3 10100011 | 01010000 | 50 | A4 |
| | 9D 10011101 | 11010010 | D2 | 26 |
| | 46 01000110 | 10001010 | 8A | 7E |
| | DC 11011100 | 11100110 | E6 | 12 |
| | 74 01110100 | 01011110 | 5E | AA |
| | F4 <-- XOR stack result | | | |

Fig. 15

"Splitting:"

| Steps: | Hex | Bit | File 1 (hex) | File 2 (hex) |
|---|---|---|---|---|
| Input Bytes 1 & 2 | A3 18 | 1010 0011 0001 1000 | | |
| OTP Bytes 1 & 2 | C2 2D | 1100 0010 0010 1101 | | |
| XOR result | 61 35 | 0110 0001 0011 0101 | 63 | 15 |

Fig. 16

"Zippering":

| Steps: | Hex | Bit | Zipped file (hex) |
|---|---|---|---|
| File 1 input | 63 | 0110 0011 | |
| File 2 input | 15 | 0001 0101 | |
| "remix" | 61 35 | 0110 0001 0011 0101 | |
| OTP bytes 1 & 2 | C2 2D | 1100 0010 0010 1101 | |
| XOR the remix & OTP | A3 18 | 1010 0011 0001 1000 | A3 18 (original bytes) |

Fig. 17

METHOD AND SYSTEM FOR EFFICIENTLY GENERATING A HIGH QUALITY PSEUDO-RANDOM SEQUENCE OF NUMBERS WITH EXTRAORDINARILY LONG PERIODICITY

This application is a divisional and claims the benefit of the filing date of U.S. patent application Ser. No. 13/309,544, entitled "Methods and Systems for Deriving a Cryptographic Framework," filed on Dec. 1, 2011, which is incorporated herein by reference to the extent permitted by law.

FIELD OF INVENTION

The present invention and disclosed embodiments relate generally to the field of encryption, and more specifically to methods and systems using multi-dimensional geometry, key exchange schema, pseudo-random number generation, and external authentication factors to derive a cryptographic framework.

BACKGROUND

The history and body of art surrounding the ciphering of information dates back over two millennia. This is a rich field of practice. The first major significant advancement in cryptography in the modern era was offered by (RSA) Rivest, Shamir and Adlemen in their invention (U.S. Pat. No. 4,405,829). Subsequent directions in block ciphers ushered in by the National Institute for Standards and Technologies (NIST) release of the Advanced Encryption System (AES) have expanded the art another generation. Most recently the use of Elliptic Curve Cryptography (ECC) has opened up yet another new direction in cryptography. There is an ever expanding field of art in Public Key Infrastructure, Key Derivation and Exchange Methods and more. Each succeeding generation of encryption algorithms has advanced the art. However, each method heretofore has been limited to a nature that is uni-functional and not extensible.

Society is increasingly relying on cryptographic systems to secure a great many applications covering virtually every aspect of modern life including financial systems, health care information, electronic communications from simple messaging to global video teleconferencing, military and surveillance applications, corporate asset protection and more. Simultaneously, as virtually all of this data is now instantiated in computer systems by necessity, a wide range of opportunists, thieves, other malicious actors, nation-states and more, are regularly attacking cyber resources, including encrypted resources, and compromising the digital assets contained in those systems. Existing solutions from RSA to AES are increasingly vulnerable to a variety of clever social engineering, brute force and mathematical attacks that weaken their ability to protect the data assets they are used to secure. Furthermore, as the volume of users increases, the volume and rate of data being securely stored or transmitted is increasing non-linearly. In some situations, existing art is insufficient to meet these demands. For example, block cipher systems such as DES and AES introduce network latencies that make high definition video conferencing impractical in all but the most expensive hardware-augmented solutions.

Each cryptographic method offers its own set of advantages and disadvantages. Only a system utilizing a One Time Pad (OTP) approach, properly implemented, can offer "information-theoretically secure" encryption (meaning that the system remains secure even if an adversary has unlimited computing resources and power). The OTP was invented by Gilbert Vernam in 1918. Claude Shannon subsequently proved mathematically, as published in the Bell Labs Technical Journal in 1949, that properly implemented OTPs were information-theoretically secure. However, in order to meet Shannon's rubric for being properly implemented, there are four elements that have historically proven difficult enough to implement to make an OTP less than a practical solution.

These requirements are:
  The OTP must be a single cipher key that is non-repeating and is equal or greater in length than the plaintext which is being ciphered
  The OTP must be held in complete secrecy known only to the trusted parties (ideally, never exchanged)
  The OTP must never be used again
  The OTP must be indistinguishable from random data Each of these requirements, taken alone, has significant and daunting practical implications, but when considered together, until now, no practical solution has emerged.

Shannon's requirements mean that two or more parties be able to use a new and different internally random OTP for every exchange of secured data; that the OTP be of equal or greater length than the plaintext and, ideally, never exchanged by the trusted parties. Clearly, in modern systems where data sizes are often megabytes, gigabytes or terabytes in size—it is impractical to generate a sufficiently long and randomized OTP and find a way to securely transmit that OTP to the recipient. One Time Pads offer so-called perfect secrecy, but, historically, at too high a cost to be practical.

Additionally, historically, encryption systems have intimately tied encryption keys (authentication factors) to passphrases, biometrics, or software and/or hardware-based symmetric/asymmetric keys alone (either public or private). In some cases, implementations of various cryptographic algorithms in software or hardware have accepted more than one authentication factor. For example, an AES-256 implementation could require both a passphrase and a fingerprint for authentication to encrypt/decrypt. However, these are typically combined using a variety of methods into a single authentication input and thus form a single key of known 256 bits of length/strength (as in the case of AES-256). More than one authentication factor, while it has added entropy to the finite number of bits available, has not typically meant an increase in bits of strength of encryption. Therefore, historically, multi-factor authentication offers increased security, but only in as much as it adds entropy, not bits of strength, to the encryption.

Thus, a need exists for an approach to encryption that offers real and practical solutions to Shannon's requirements, as well as an approach that offers real multi-factor authentication that actually increases security, as well as entropy and that outperforms block cipher solutions to facilitate real-world and relevant data streaming and other applications.

SUMMARY

The current invention comprises methods and systems for encrypting and decrypting information. The user of an encrypting device, conventionally a contemporary computer system, and one or more users of a decrypting device, conventionally a contemporary computer system, choose to exchange data securely via encryption.

In an embodiment, the sending party, using this invention, can construct a specific multi-dimensional geometric form as a device for key derivation and synchronization. One or more secret initialization values can be extracted from this specific multi-dimensional geometric form and shared, via any number of common secured key exchange protocols, with the one or more recipients. The recipients may consume these initialization values in order to reconstruct the same multi-dimensional geometric form as the sending party with perfect fidelity. With both sender and recipient(s) having possession of the same specific multi-dimensional geometric form, they may apply this method to extract from that form, the same set of public and secret key values and thus the exact same discrete set of prime numbers. These prime numbers function as seeds to a random number generator function.

In an embodiment, both sender and recipient(s) can derive the same discrete set of prime numbers and transform them into a collection of number sequences called MIRPs. A MIRP is the Mantissa of the Irrational Root of the Prime number. That is to say that the sender and recipient(s) both perform a square root or other known function on the prime numbers, in each case generating (by number theory definition) an irrational floating point number. The result is further transformed by truncating the integer portion and decimal point leaving a remainder of a predetermined length. This remainder is a series of values of near-random nature, by definition of an irrational number. This remainder is the MIRP.

Each MIRP can be arranged into a two or three-dimensional structure, called the "MIRP-Stack" according to a predetermined process. Each MIRP repeats indefinitely within its own "layer" of this structure. In an embodiment, each MIRP can be either decremented or incremented by one number (byte) as they are assembled in the predetermined structure.

This MIRP-Stack can then be processed according to a predetermined method. One predetermined method is to perform a series of bitwise operations of an exclusive or (XOR) on a predetermined selection and order of values (bytes) in the MIRP-Stack to yield a single final value for that collection being processed. In this fashion, the MIRP-Stack is processed to produce a series of values that have been proven through testing to be indistinguishable from random. The combination of MIRP-Stack structure, staggered MIRP length and particular process for operating on this MIRP-Stack structure result in a non-repeating sequence of values (8-bit bytes) of extraordinary length and randomness. The resulting sequence of bytes act as a One Time Pad (OTP). This novel method for random number generation has value in a number of applications. Certainly one of those is to use it as a One Time Pad in a cryptographic application. However, it has utility in other arenas as well. A random number generator, particularly a software-based one, where the output is essentially, if not literally, indistinguishable from random has uses in telecommunications, gaming, various scientific modeling and simulation situations, financial markets and more.

In a cryptographic application, a final exclusive or (XOR) operation can be performed on one byte of the plaintext with the corresponding byte from the OTP—to generate a ciphertext value. This process repeats until the plaintext is fully ciphered.

The recipient, having reconstructed the same specific multi-dimensional geometric form, can extract the exact same discrete set of (seemingly random) prime numbers and produce the same exact OTP as the sender. Decrypting any cipher text is then the same as encrypting one, namely, process the MIRP-Stack to generate a byte of the OTP and then perform a simple exclusive or (XOR) operation on the ciphertext in combination with the OTP byte to decipher back to plaintext.

The various embodiments described above, as well as the other variants described herein, comprise a system known as the UberCrypt Framework. Additionally, this invention offers a number of optional use cases and additional novel methods to extend this basic cryptographic functionality.

In the previously stated use-case, the sender and recipient(s) can hold a small collection of initialization values in common and in secret. These values act similarly to encryption keys, though they are not directly involved in the actual encryption process themselves. In that use-case, the sender and recipient can have a pre-established trust relationship that holds the keys in common. This is a conventional symmetric key encryption approach. However, this invention also supports the use-case whereby a sender and a recipient may not have a pre-established set of trust keys. In this use-case, a passphrase alone, or other authentication factor, is used to secure the communications and/or data.

When a passphrase or other factor alone is used, that passphrase can be transformed via a particular method, to a MIRP. From that MIRP, a set of initialization values can be extracted for constructing a specific multi-dimensional geometric form. From this point forward, the method returns to the original method described above.

This invention offers still more extensibility. The sender and recipient(s) may establish a trust relationship and hold a semi-static specific multi-dimensional geometric form in common. Recall that this geometric form can be used as a device for extracting prime numbers which can be seeds to generating, via the MIRP-Stack, a highly random and extraordinarily long OTP. They may add to this MIRP-Stack one or more additional MIRPs that were outputs of a passphrase conversion process. That is to say that the sender and recipient may use both a set of established trust keys and a passphrase thus increasing the "size" of the MIRP-Stack and thus the overall non-repeat length and randomness of the OTP. Each additional MIRP layer that is added also increases the overall entropy of the resulting key stream/OTP.

This MIRP-Stack may be further extended with other so-called "Extended Authentication Factors". That is to say that additional data such as, by way of example and not limitation, the Internet Protocol Address or Media Access Card Address or Geospatial Positioning System coordinates or any other digitally representable data including the presence and contents of other plaintext or ciphered data files, may be transformed into one or more additional MIRPs to be added to the MIRP-Stack.

With each MIRP added to the MIRP-Stack structure, additional bits of security are added, additional entropy is added to the OTP, and the OTP's non-repeat period is extended. This is an essential element of the novel value of this invention; whereas other cryptographic algorithms are constrained by a fixed number of bits of strength—this method is not. The value of this is that an attacker of an existing cryptographic algorithm will always know the number of bits of strength used and thus narrow the range of the brute force attack. With this method—this extensibility offers those wishing to secure data a method by which they may do so in a completely synchronized way—but an attacker would never have any idea how many bits of strength was used for any particular encryption. This effectively means that their attack size is undefined. This, in concert with the proper (as will be defined later) use of a random One Time Pad—means that any encryption completed using this method will be secure from any attacker armed with even a limitless amount of computing power.

Finally, this invention provides a method by which the final ciphertext output may be split into two or more separate encrypted files using a particular method that literally splits bytes in the process. Any recipient(s) of an encrypted message must thus possess all the split encrypted files in order to reconstruct and decrypt the original message. This can provide the sender and recipient(s) the added security of being able to transmit a single body of data over multiple channels with complete security since no one portion contains either enough data for decryption or cryptanalysis. The recipient(s), however, possessing all the split portions of the original encrypted file, as well as the appropriate geometric form, and/or passphrase, and/or Extended Authentication Factors—may recombine these files back together while simultaneously deciphering back to the original plaintext.

BRIEF DESCRIPTION OF THE DRAWINGS

FIG. 13 illustrates a sample MIRP-Stack showing a 2-D five-layer MIRP-Stack with a descending MIRP length and a start length of 8 bytes;

Figure 14:
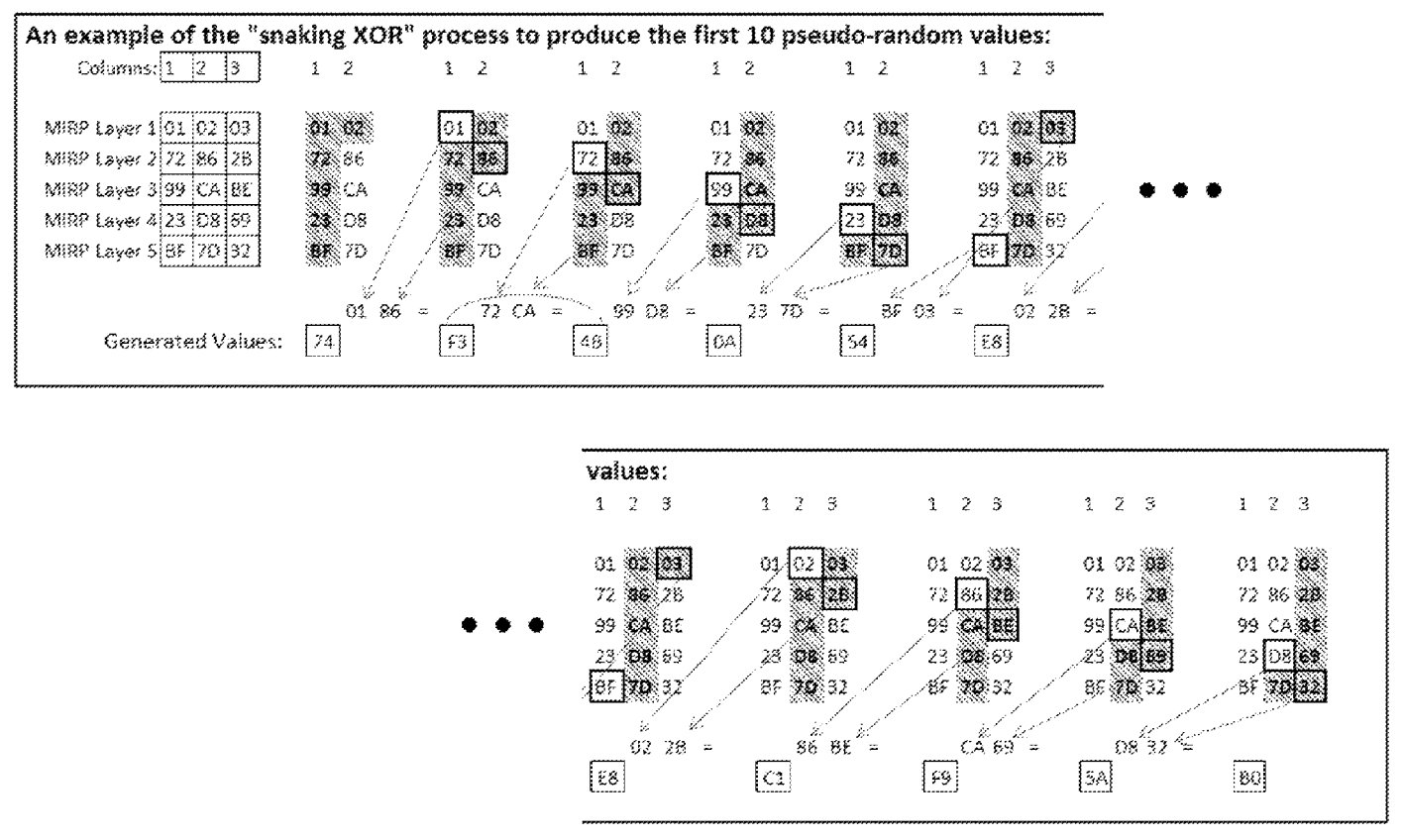

FIG. 14 illustrates an embodiment of a "snaking" XOR process showing, step by step, one method of processing the MIRP-Stack to produce a randomized key stream (OTP) of values;

FIG. 15 illustrates an embodiment of a "bit block transposition" process to produce OTP values. This figure shows an alternative method for processing a column of a 2-D MIRP-Stack using a bitwise matrix transposition;

FIG. 16 illustrates an embodiment of a Split process;

FIG. 17 illustrates an embodiment of a Recombine process;

DETAILED DESCRIPTION

Figure 1:
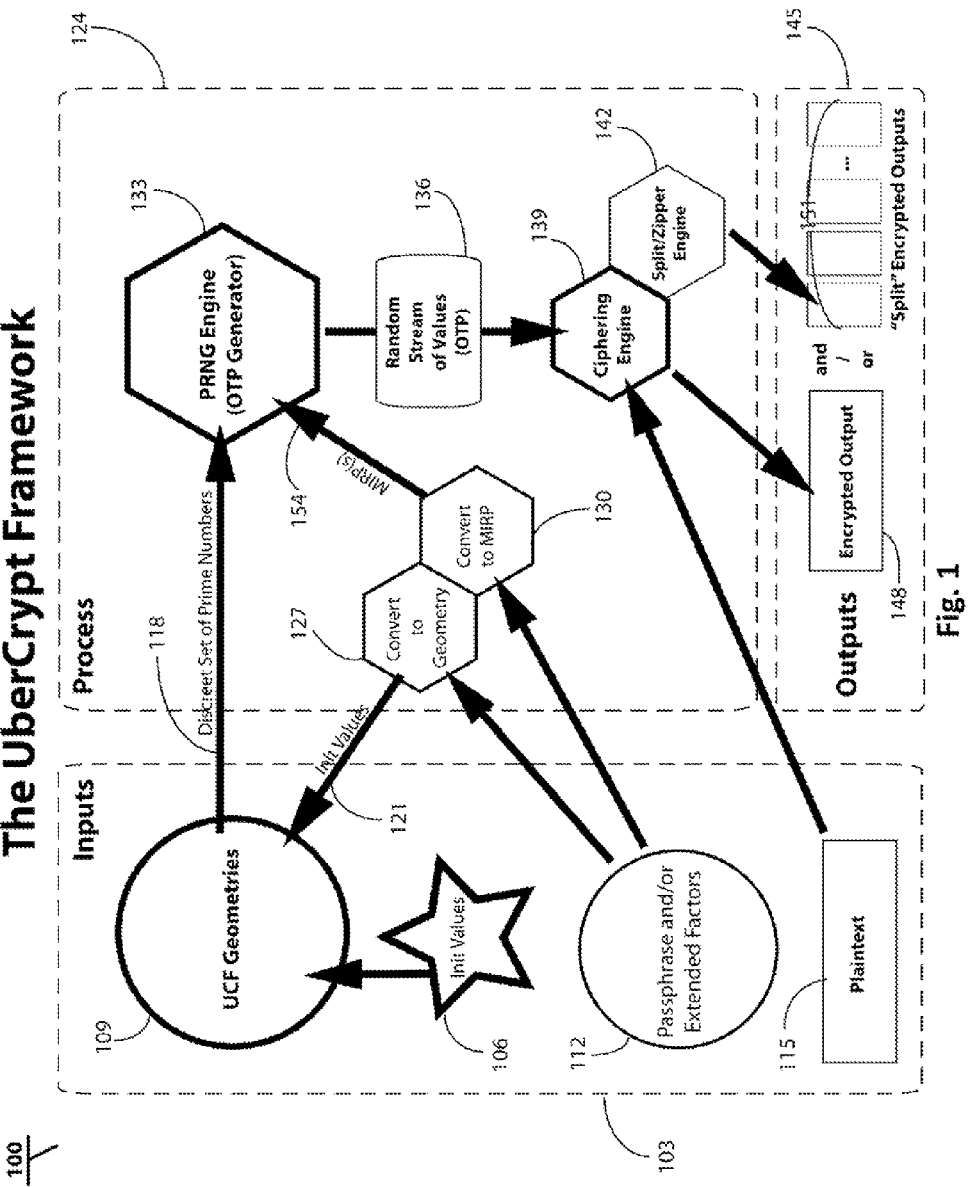
FIG. 1 depicts a block diagram showing all the major components of an embodiment of the UberCrypt Framework with arrows indicating information flows.

As shown in FIG. 1, a UberCrypt Framework (UCF) 100 can use a range of multi-dimensional geometries that can provide a number of useful things in a trust relationship and can allow, in an embodiment, new data encryption capabilities. A multi-dimensional geometry means any set of attributes associated with a geometric figure that has been extended in multiple dimensions, including any known characteristics. A multi-dimensional geometry 109 can permit a user to select a discrete set (but appearing to be a random set) of large prime numbers 118 in a particular sequence from an immense pool of large prime numbers. The characteristics of Geometry 109 can allow trust partners to securely synchronize the same geometry and thus select the same set of prime numbers 118 from that immense pool of said prime numbers.

UCF 100 can also employ a Pseudo-Random Number Generator (PRNG) 133 that can consume this discrete set of prime numbers 118, in addition to other factors. Using these prime numbers and other factors, the UCF can generate a random stream of values 136 (key stream) that can be used as a One-Time-Pad (OTP) of practical infinite non-repeating length and near perfect internal randomness. In this fashion, trust partners sharing the same multi-dimensional geometry, and additional factors, can generate the identical OTP 136 (meaning the participants can all generate the same synchronized series of random numbers).

The UCF can then perform a ciphering operation (using ciphering engine 139) on any input data using the OTP (and optional additional processing) to generate the encrypted output or, conversely, to decrypt data.

Finally, a UCF can also use a split/zipper engine 142 to "split" any encrypted stream of data or file into two or more files 151 in a particular fashion using a derivative of the OTP used for encryption. In this fashion, data can be stored or transmitted in a secure distributed fashion.

When a UCF uses ciphering engine 139 to encrypt, as a stream cipher, it can consume a byte of plaintext 115 and execute a single (XOR) operation on that byte with a single byte of the key stream (OTP) it is generating, making it extremely fast and efficient.

A UCF can construct a unique geometry 109 upon each and every encryption operation, which it can use for the sole purpose of generating a discrete set of very large prime numbers.

In an embodiment, trust partners can "synchronize" their selection of prime numbers by synchronizing their geometries in a completely secure fashion. By way of example and not limitation, once a trust relationship is established between two or more parties, those trust parties can synchronize geometry 109 (and thus discrete set of prime numbers 118) used for any particular encryption by transmitting as small as a single eight-digit integer in the clear as part of the header of an encrypted stream or file. Thus, all trust parties can construct the same OTP enabling a secure, reliable and efficient encryption/decryption cycle.

In an embodiment, geometry 109 within UCF 100 can generate and synchronize the same discrete set of prime numbers 118 between trust partners by utilizing various geometric and trigonometric properties to communicate a very large set of prime numbers with a very small set of integers or floating point values. A specific geometric form for geometry 109 can be derived from a general geometric form by applying certain initialization values 106 to certain predetermined and known characteristics of that geometry. In an embodiment, applying an initialization value means that given a general geometric form of a triangle, an initialization value can be assigned to a side of that triangle to give that scalar vector a length. A known characteristic is any geometric attribute that is inherent to that geometry. For example, all triangles have three sides and three interior angles, all of which can be considered known characteristics. Other known characteristics of a triangle are (non-exhaustive list) a hypotenuse, altitude, area, bisected angle, centroid, perimeter, etc. In another example, all circles have the known characteristics of a diameter or radius, a circumference, an area, etc. The remaining known characteristics (integer values) are converted to prime numbers through a particular method. In an embodiment, another initialization value can be a value that is assigned to one of the three interior angles of the triangle—for example, one of the two angles associated with the aforesaid side. Yet another initialization value can be a multiplier that is multiplied by the first initialization value to then be assigned to the triangle as the value of the length of the hypotenuse of that triangle. With just these three initialization values being applied to these three initial known characteristics of a triangle, the remaining known characteristics may be used to derive all of the rest of the values of the geometry using well known and well understood geometric or trigonometric properties. In an embodiment, a UCF based on a three-dimensional geometry could be a triangular pyramid, but could, in other embodiments, be a pyramid with a four, five or n-sided base, a cone, or any other multi-dimensional solid that can be expressed geometrically or algebraically.

Figure 2:
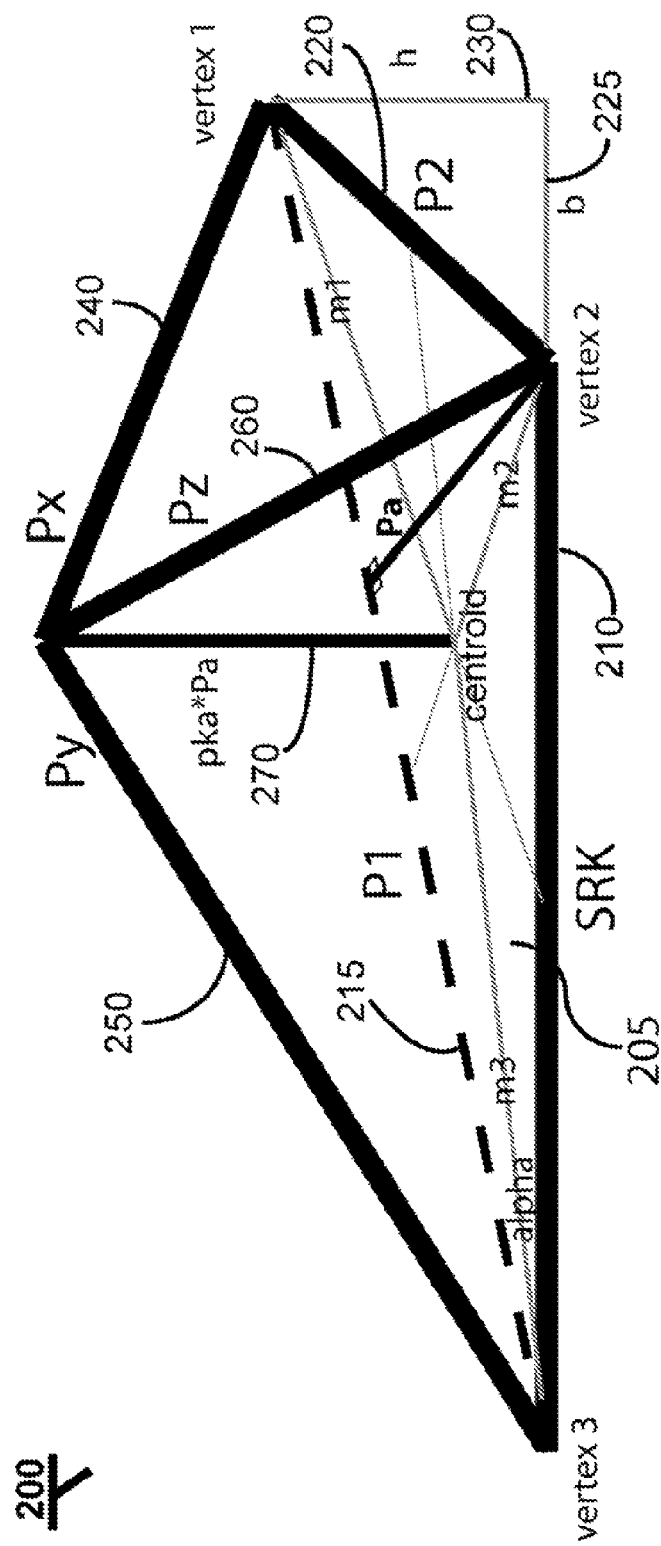
FIG. 2 depicts an embodiment of the UberCrypt Geometry in 3-D Perspective View showing a general multi-dimensional geometric form.

FIG. 2 depicts the basic parts of the geometry itself. As shown in FIG. 2, base 205 of pyramid 200 can be an obtuse scalene triangle whose sides are identified as SRK 210, prime P1 215 and prime P2 220. SRK is an acronym that stands for "Shared Relationship Key", which, in one embodiment, can be a positive integer (not limited to being prime) represented by a range of numbers such as, for example, the numbers from $2^{128}$ at the low end to $2^{32768}$ at the high end (or even higher). If the sole measure of cryptographic strength is the number of bits held by the "secret key", then the UCF's SRK's strength alone (there are other inputs), at 32768 bits or more, can be over 128 times stronger than AES-256. In an embodiment, prime P1 215 can be a prime number whose value is derived and relative to the SRK value. Prime P2 220 can also be a prime number that is derived and completes base 205 of the obtuse scalene triangle.

Figure 3A:
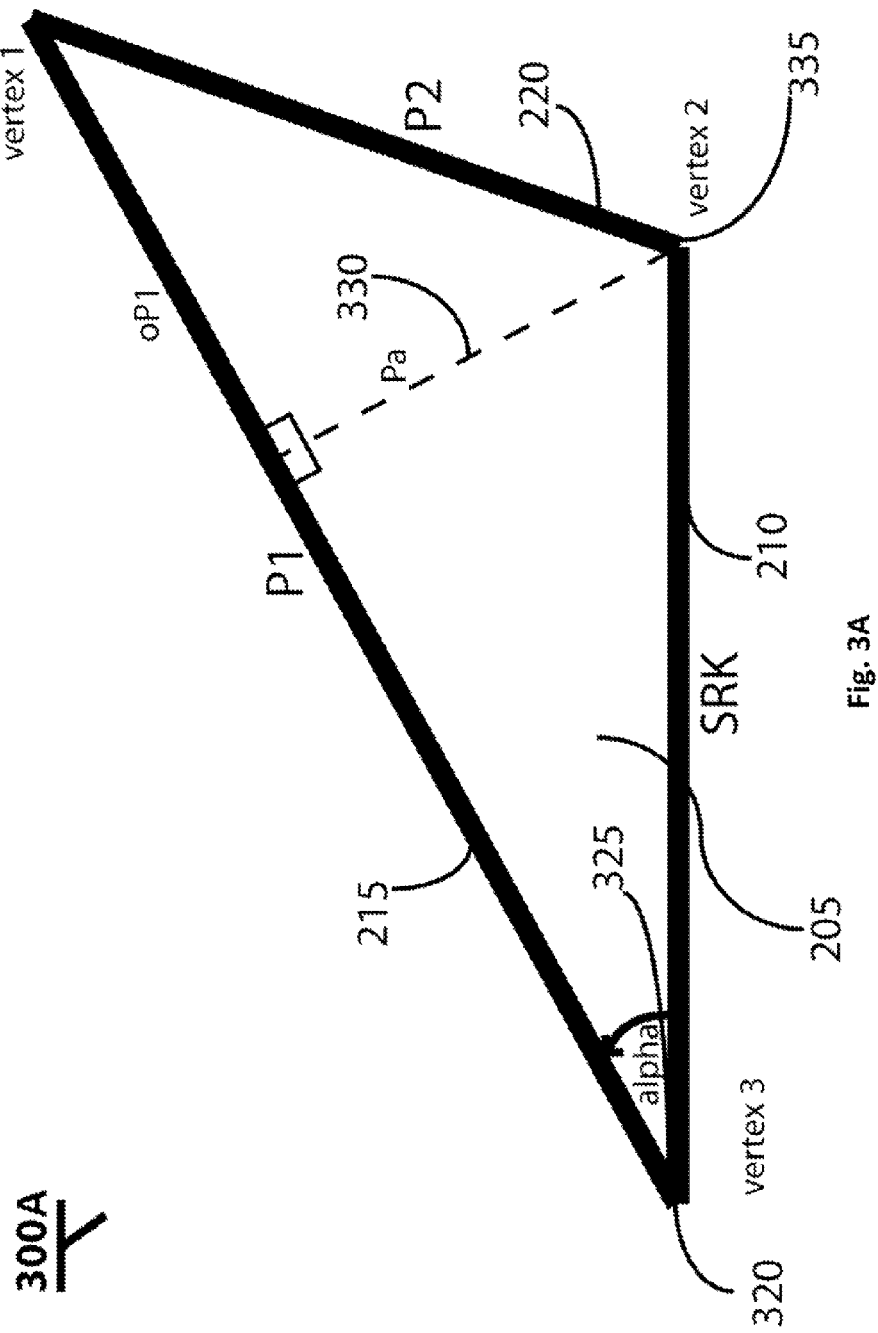
FIG. 3a depicts an embodiment of the UberCrypt Geometry in 2-D View showing one of the many general multi-dimensional geometric forms in two-dimensional view showing a three sided polygonal base.

In an embodiment, SRK 210 can be extended by length "b" (bottom) 225 such that the vector "h" (height) 230 may be drawn at a right angle to bottom 225 and terminate that the vertex of prime P1 215 and prime P2 220. Refer to FIG. 3a for a two dimensional view of the base of the pyramid.

Figure 3B:
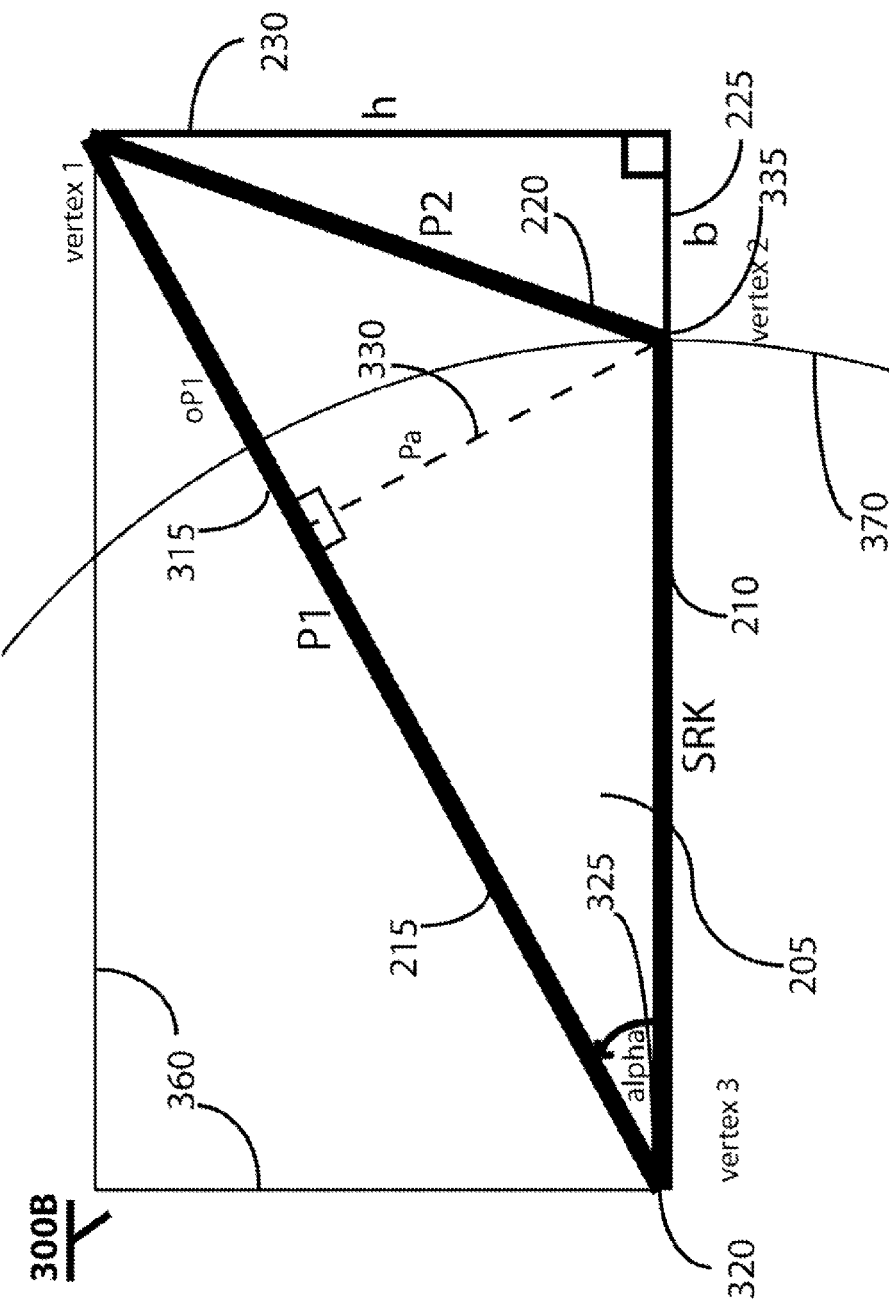
FIG. 3b depicts further details of an embodiment of the UberCrypt Geometry in 2-D View showing one of the many general multi-dimensional geometric forms in two-dimensional view showing a three sided polygonal base.

As shown in FIG. 3b, base 205 (i.e., the obtuse scalene triangle) can also "extended" into two right triangles. In an embodiment, the first right triangle can be formed by joining SRK 210 and bottom 225 as one side, height 230 as the second side, and prime P1 215 as the third side. The second right triangle can be formed by joining prime P2 220 and vector 'by' 305 as one side, vector 'hy' 310 as a second side, and prime P1 215 as a third side. A vector oP1 315 can be determined so that P1 is sufficiently large to create an obtuse triangle. The scalar value of vector oP1 315 can be chosen to be less than the length of prime P1 215 and greater than the value of SRK 210, such that its length ensures the triangle becomes an obtuse triangle with P1 215 as the hypotenuse. In an embodiment, angle 325 on vertex 3 320 can represent, in addition to SRK 210, $2^{64}$ more bits of input security (based on its length).

Figure 3C:
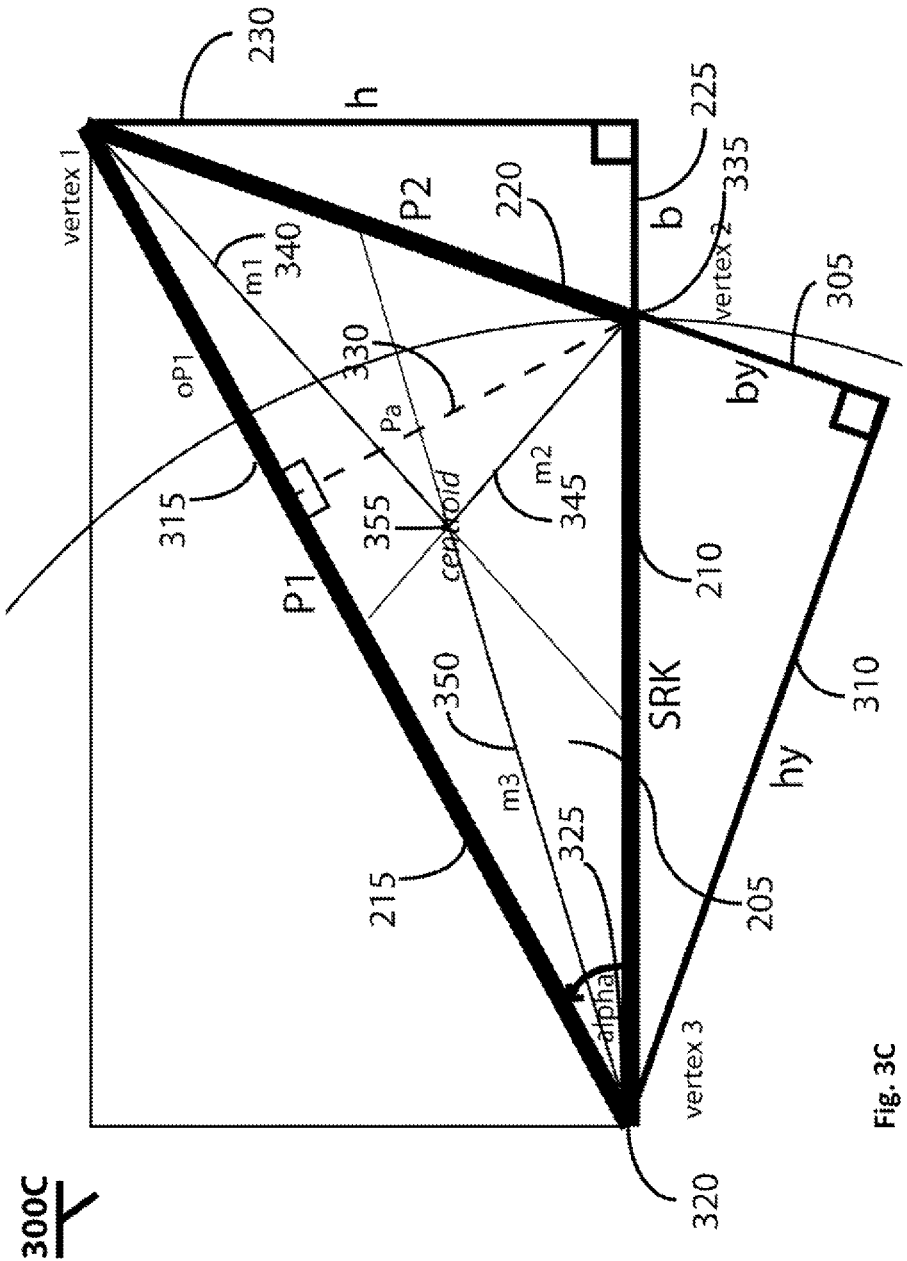
FIG. 3c depicts even further details of an embodiment of the UberCrypt Geometry in 2-D View showing one of the many general multi-dimensional geometric forms in two-dimensional view showing a three sided polygonal base.

Base 205 (i.e., the triangle formed by SRK 210, prime P1 215, and prime P2 220) contains a multitude of known characteristics expressed as vectors, angles, and other geometric attributes. In an embodiment, these known characteristics can include, by way of example and not limitation, Vector Pa 330 shown as perpendicular to prime P1 215 and intersecting with vertex 2 335. Vector Pa 330 can also become a prime number through a particular process. In an embodiment, construction of the third dimension of geometry 109 within UCF 100 can utilize Vector Pa 330 (or any of the myriad of other possible Vector Pas that are inherent to the two-dimensional geometry shown in FIG. 3).

Finally, vectors m1 340, m2 345, and m3 350 can be drawn from their respective vertex to the bisected opposite side. At the mutual intersection of these vectors is centroid 355, which can be a known characteristic of the triangle formed by SRK 210, prime P1 215, and prime P2 220. In an embodiment, centroid 355 can be the point at which a variant of vector Pa 330 is derived from known characteristics to form the altitude (or "tent pole") 270 of pyramid 200 as shown in FIG. 2. It is important to note that multiple variations of points can exist that are inherent to this two-dimensional geometry that can be used as the base for erecting this altitude.

Referring now back to the three-dimensional geometry (i.e., pyramid 200) in FIG. 2, a variant of vector Pa 330 can be erected from centroid 355 described by the intersection of m1 340, m2 345, and m3 350. From that altitude three additional vectors can be formed: Px 240, Py 250 and Pz 260 to form the edges of pyramid 200. Each of these vectors ultimately can be converted to prime numbers.

In general, a UCF geometry (such as shown in FIG. 2, or FIG. 3a-FIG. 3c) can be constructed by one of two or more parties that share a trust relationship. During the initiation of that trust relationship, a UCF two-dimensional geometry can be constructed. Later, upon any encryption operation, the third dimension of the geometry can be created by the encrypting party and a single public value can be included in the header of the encrypted file (or stream) that enables the decrypting party to match the three-dimensional geometry and, thus, the discrete set of prime numbers.

Alternatively, a full UCF three-dimensional geometry can be constructed dynamically from just a passphrase or any other shared or agreed upon digital value. In this fashion, parties wishing to exchange encrypted materials may do so in an ad-hoc fashion requiring only a passphrase to encrypt and decrypt. The underlying geometry, OTP generation and ensuing encryption can all be handled dynamically from the passphrase used.

Key Derivation and Synchronization Example

Figure 19:
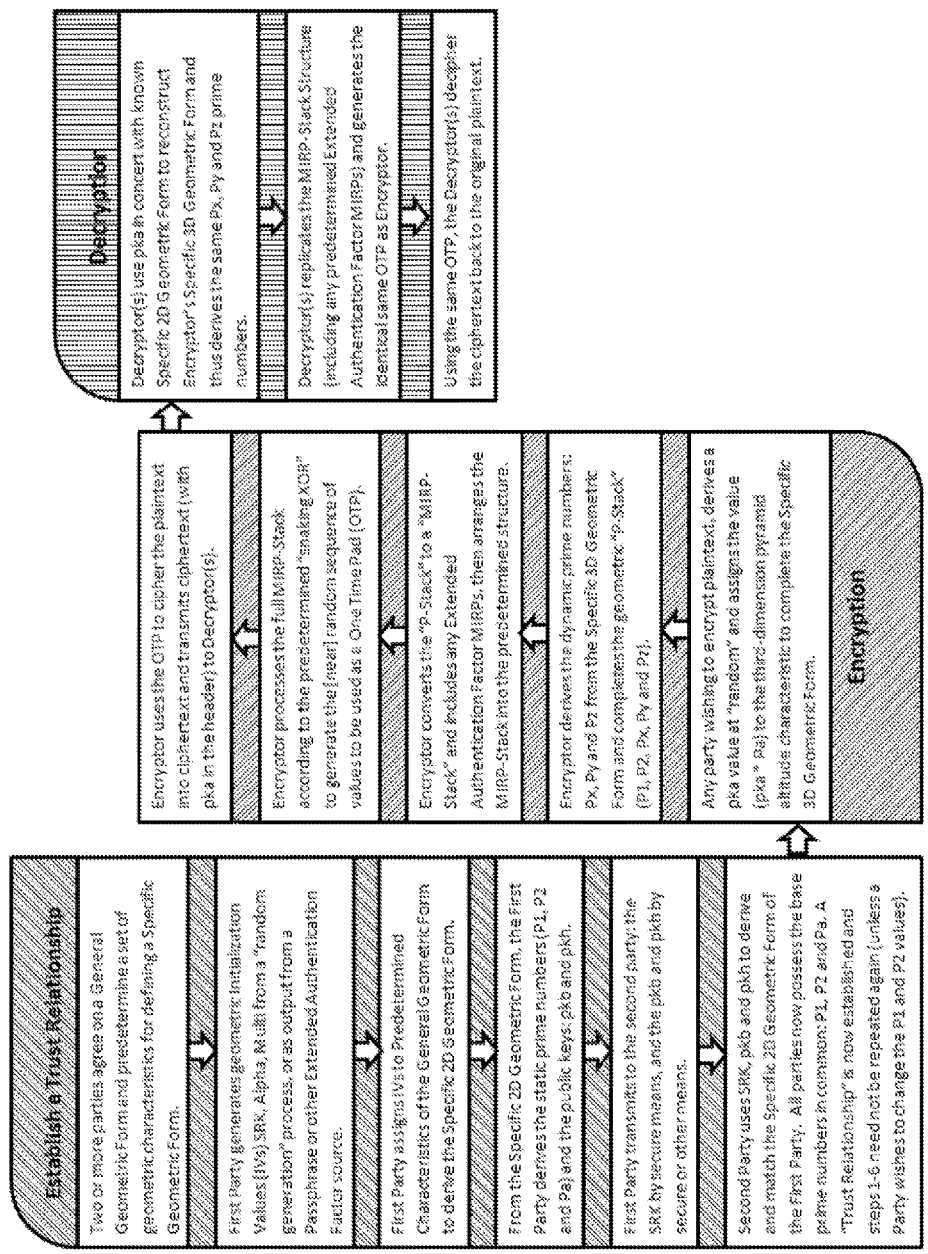
FIG. 19 illustrates a method according to an embodiment of the invention to establish a trust relationship, encrypt, and decrypt data.

By way of example only and not limitation, the following fictional walkthrough illustrates the construction and use of a geometry according to an embodiment of the present invention between two fictional characters "Alice" and "Bob". It will be useful to also refer to FIG. 19 during this walkthrough. Alice and Bob agree to use the UberCrypt Framework and agree to enter into a trust relationship.

Entering into that relationship means sharing at least three keys. In one embodiment, this could comprise one secret key and two public keys. In an alternative embodiment, all three keys could be kept as secret keys. This choice is up to the implementer. For this discussion, we will take the approach of keeping the one secret key private and computing and sharing the two other keys as public.

In an embodiment, Alice and Bob utilize the "SRK" which stands for the "Shared Relationship Key" as the secret key. This key is never used in the actual encryption, so essentially represents the relationship between Alice and Bob. It can be shared by all the parties in a trust relationship, but is kept secret.

By whatever method is preferred by Alice and Bob, they establish and exchange SRK 210, as shown in FIG. 3. SRK 210 is now held in secret by both Alice and Bob. SRK 210 can be, in this embodiment, a long integer ranging from $2^{128}$ at the low end to $2^{32768}$ at the high end. SRK 210 is a value that is assigned to a vector, that is: a line, on a geometric plane as illustrated in FIG. 3.

One of the parties, let's say Bob, then becomes the lead, a one-time role simply to establish two more values as shown, namely P1 315 and P2 320 forming the other two sides of a triangle: the specific multi-dimensional form to be used.

From this triangle (an obtuse scalene triangle in this embodiment), the intermediary values h 230 and b 225 are derived. These are simply the height and additional base sections of the right triangle described by P1, h 230, and (b 225+SRK 210). Two resulting values, as will be more fully explained herein, can include pkh (public key based on h 230) and pkb (public key based on b 225) The pkh and pkb values can be abstracted from this geometry and now fully public values. That is to say that these can be transmitted anytime (though typically only once) without fear of compromise as they are both useless without the value of SRK 210 which is held in secret.

Using pith and pkb as a method for securely transmitting the P1 315 and P2 320 values can and does effectively allow an attacker to compute the lengths of P1 315 and P2 320 relative to a SRK 210 length of one (1). In this fashion, the attacker could derive the angles and relative side lengths—but could not derive the magnitude (scale) of any of the three sides. It is for this reason that SRK 210 must be kept in secret and, ideally, both P1 315 and P2 320 as well. If the implementer chooses to use the pkh and pkb as a means of exchanging P1 315 and P2 320 (there are some operational advantages to this), then at least they can be assured that the encryption is still secure unless an attacker can correctly guess the magnitude of SRK 210.

Continuing the exemplary walkthrough, Bob now sends pkh and pkb to Alice. From these values, Alice can easily reconstruct the P1 315 and P2 320 values. In this fashion, a two-dimensional geometry has been fully described and synchronized between Alice and Bob without any fear of an interceptor being able to replicate the geometry at the correct scale.

Both Bob and Alice now possess the same triangle, or specific geometric form, that forms the semi-static base of the pyramid (i.e., the general geometric form). Semi-static refers to the notion that SRK 210, P1 315, and P2 320 do not, in an embodiment, need to change on every encryption operation (and may also be referred to as "relatively static"). This specific two-dimensional geometric form may be redefined at any time by any member of a trust relationship by regenerating new P1 315 and P2 320 values and re-abstracting the pkb and pkh values and retransmitting them.

Now that the base of the geometry (two dimensions) is established and relatively static, either party can construct the third dimension on demand when needed to encrypt data. Let us assume that Bob needs to share data securely with Alice. To do this, Bob can erect a vertical vector (i.e., altitude) perpendicular to the plane of the triangle. This altitude can be generated "randomly" upon every encryption.

The altitude can be based on vector Pa 330 which can be derived from the geometry any number of ways as explained later. Once Pa 330 is known, Bob generates a "random" floating point value called pka (for "public key altitude") which can be, conventionally, less than one and greater than zero. Bob erects an altitude vector of a "random" length (Pa 330*pka) but known only to both Alice and Bob by virtue of the known P1-P2-SRK 210 geometry.

As the illustration in FIG. 2 shows, with altitude 270 based on the Vector Pa 330 (Pa 330*pka to be exact), Bob is able to calculate the three new vectors (edges to new triangles) of Px 240, Py 250 and Pz 260. These vectors represent three new, and dynamically created prime numbers. These numbers, along with the two known and static prime numbers (P1 315 & P2 220) form what UberCrypt calls the "P Stack" or stack of prime numbers that are used as the base part of the encryption process. (This will be explained later.) Suffice it to say for now that these five prime numbers are "seeds" to this random number generator and subsequent encryption process. It is important to note that the prime numbers themselves are not used as actual cipher keys.

Upon receiving the encrypted data from Bob, Alice extracts the pka value from the header and, based on this value, reconstructs the exact same Px 240, Py 250 and Pz 260 values that Bob created, all from the geometry. Now having the exact same discrete set of prime numbers (P1 215, P2 220, Px 240, Py 250 and Pz 260 values)—Alice is able to decipher Bob's file.

After reviewing Bob's data, Alice formulates a response which she wants to send to Bob securely. Alice then dynamically generates a new pka, and thus new Px 240, Py 250 and Pz 260 values. Using the new "P Stack" (defined as the collection of values P1 215, P2 220, Px 240, Py 250 and Pz 260)—Alice encrypts her response and sends it (with the new pka value embedded in the header).

Bob simply uses the new pka value to reconstruct the new Px 240, Py 250 and Pz 260. Having reconstructed the new specific multi-dimensional geometric form as Alice, Bob extracts the new P-Stack and deciphers Alice's file.

Note that the basis for calculating Pa 330 can vary. The default geometric source is shown in FIG. 3 as the vector perpendicular to P1 215 on the plane of the triangle and intersecting with the triangle vertex formed by SRK 210 and P2 220 sides. This simple UCF three-dimensional Geometry, that leverages simple known characteristics of triangles, yields a total of six discrete prime numbers (P1 215, P2 220, Px 240, Py 250, Pz 260 and Pa 330) where the Px 240, Py 250 and Pz 260 prime numbers are dependent on the form of Pa 330 chosen.

Geometric Variations

Figure 4:
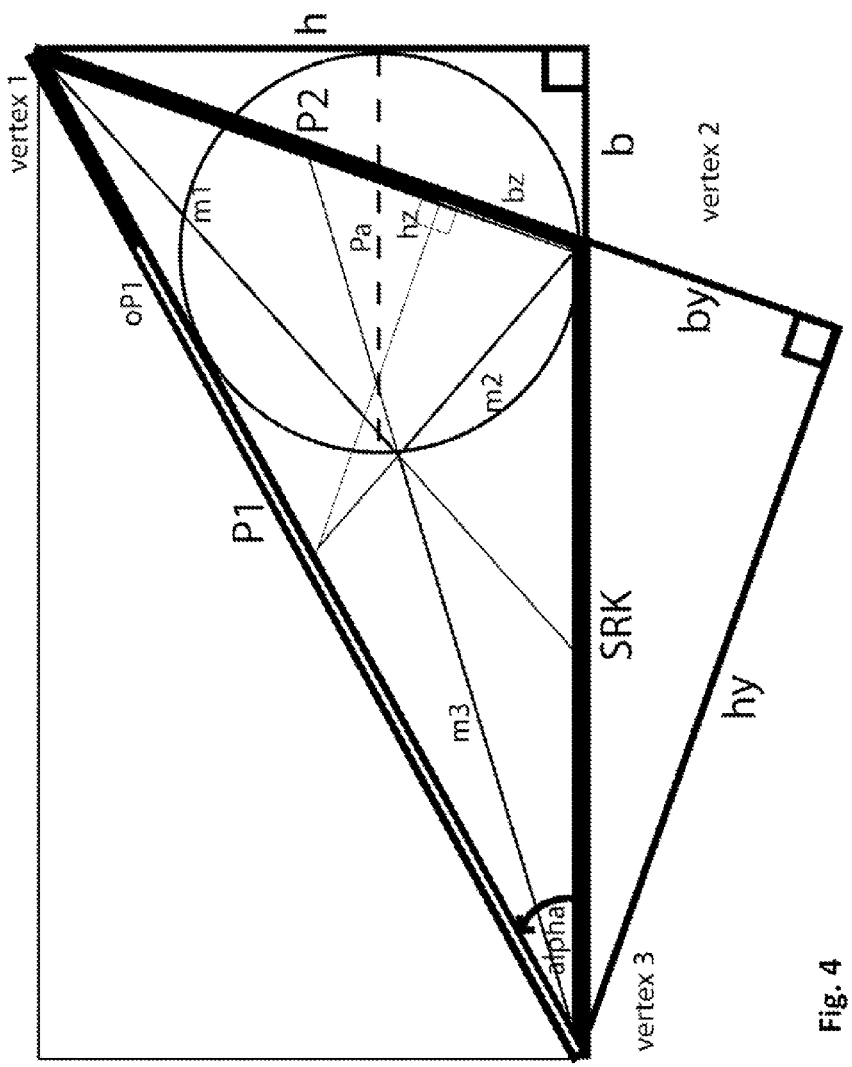
FIG. 4 depicts an embodiment of the UberCrypt Geometry in 2-D View showing a variant for calculating the Pa vector from a known characteristic.
Figure 5:
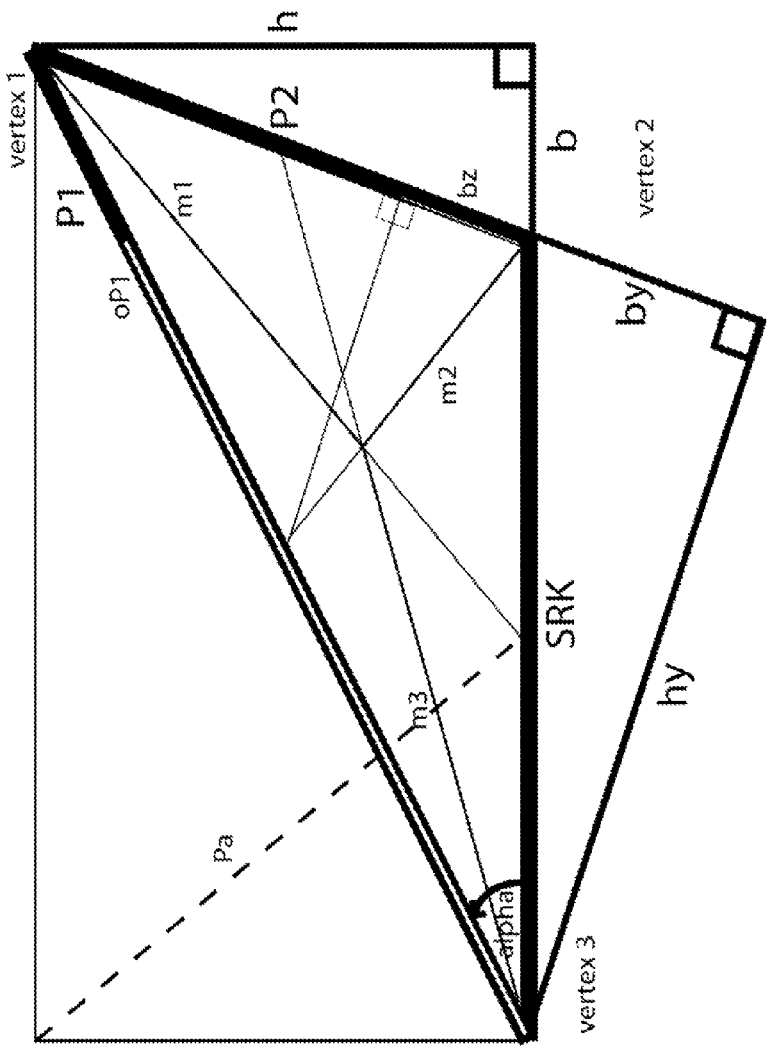
FIG. 5 depicts an embodiment of the UberCrypt Geometry in 2-D View showing a variant for calculating the Pa vector from a known characteristic.

Other methods can be chosen by the implementer for deriving vector Pa 330. Such methods can leverage other known characteristics (in the example above, those would be known characteristics of the triangle that is the basis of geometry 109). Referring now to FIG. 4 and FIG. 5, two alternative approaches are depicted for deriving the base Pa value (shown in straight dashed lines), but there are myriad more options.

Notice, also, that these are just variations for the height of the "tent pole", they do not account for the various placements (versus the example centroid found at the intersection of m1, m2 and m3) of that tent pole. This number of alternative placements of the tent pole is also very large.

Figure 6:
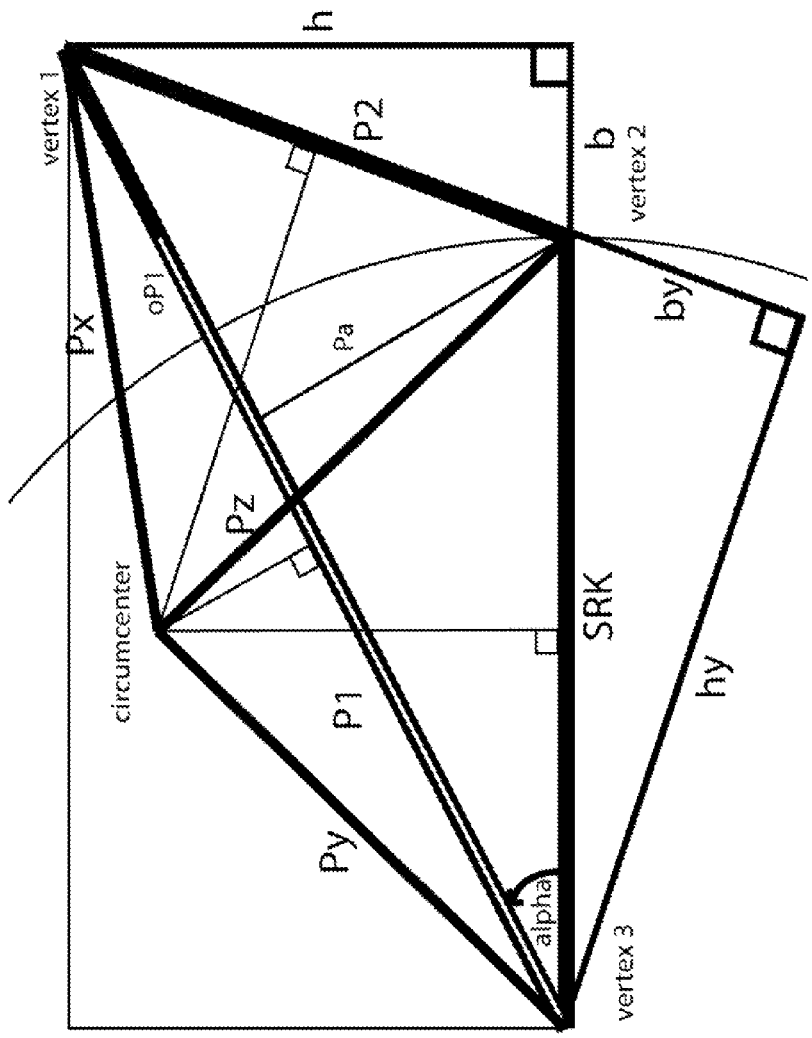
FIG. 6 depicts an embodiment of the UberCrypt Geometry in 2-D view, showing an alternate Pa placement: the third dimension vector is placed at the inherent circumcenter of the three-sided polygonal (triangle) base.
Figure 7:
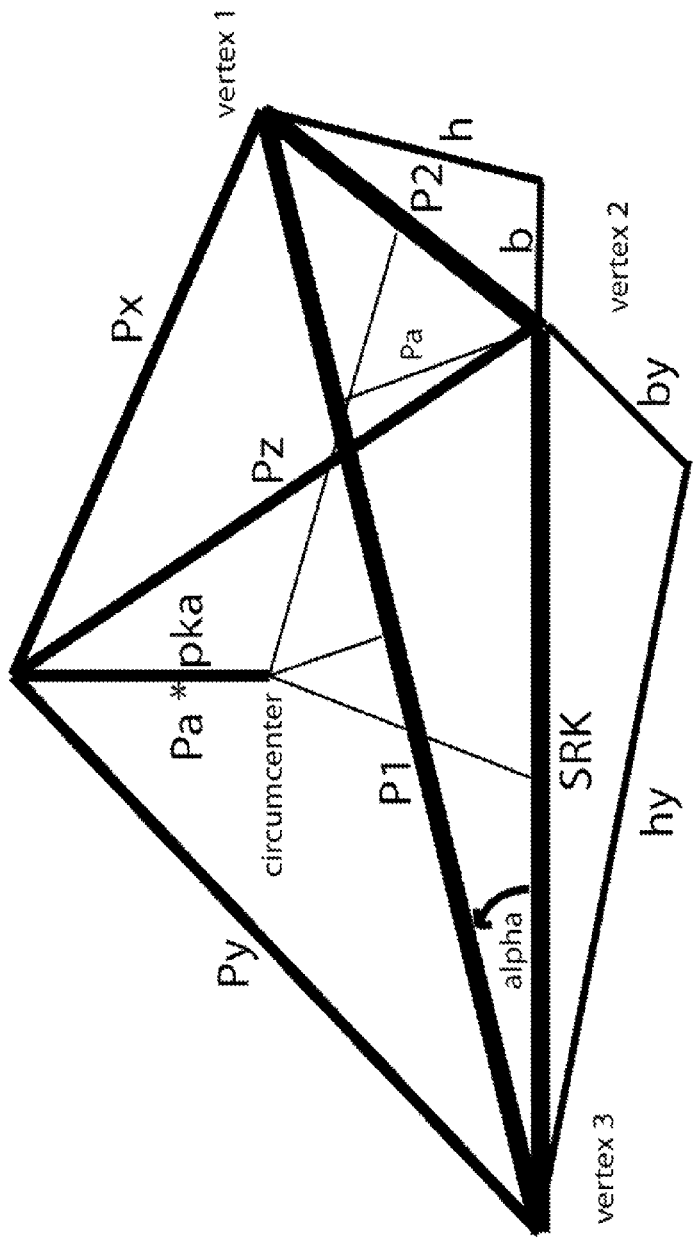
FIG. 7 depicts an embodiment of the UberCrypt Geometry, 3-D perspective view, showing an alternate Pa placement: the third dimension vector is placed at the inherent circumcenter of the three-sided polygonal (triangle) base.

FIG. 6 and FIG. 7 show another placement of the tent pole being at the Circumcenter of the triangle. It may also be placed at the Orthocenter or any other geometrically derivable location (known characteristic) either inside or outside of the triangle.

Finally, the "tent pole" need not be perpendicular to the plane of the triangle. In addition to basis for calculation and placement, the tent pole can be at an angle. While this adds some geometric and computational complexity, it can add variability to the resulting Px, Py and Pz values. This variability enhances security.

Consequently, each implementer, just by choosing a different basis for calculating their vector Pa and/or its placement and/or its angle, has the ability to essentially create their own UCF form that is non-overlapping with other UCF implementations. With as few as seven Pa calculation methods and only three placement methods, there would be a combined 21 distinct forms for the three-sided pyramid— each resulting in a unique set of $3^{rd}$ dimension prime numbers. In an embodiment, any combination of these forms (including all forms) could be used in the same implementation for a single encryption, thus generating a total of 65 unique prime numbers for one base geometric form. Alternatively, the implementer can predetermine these 21 forms, and use a function at the time of encryption to select which form or forms to use for that encryption.

Figure 8:
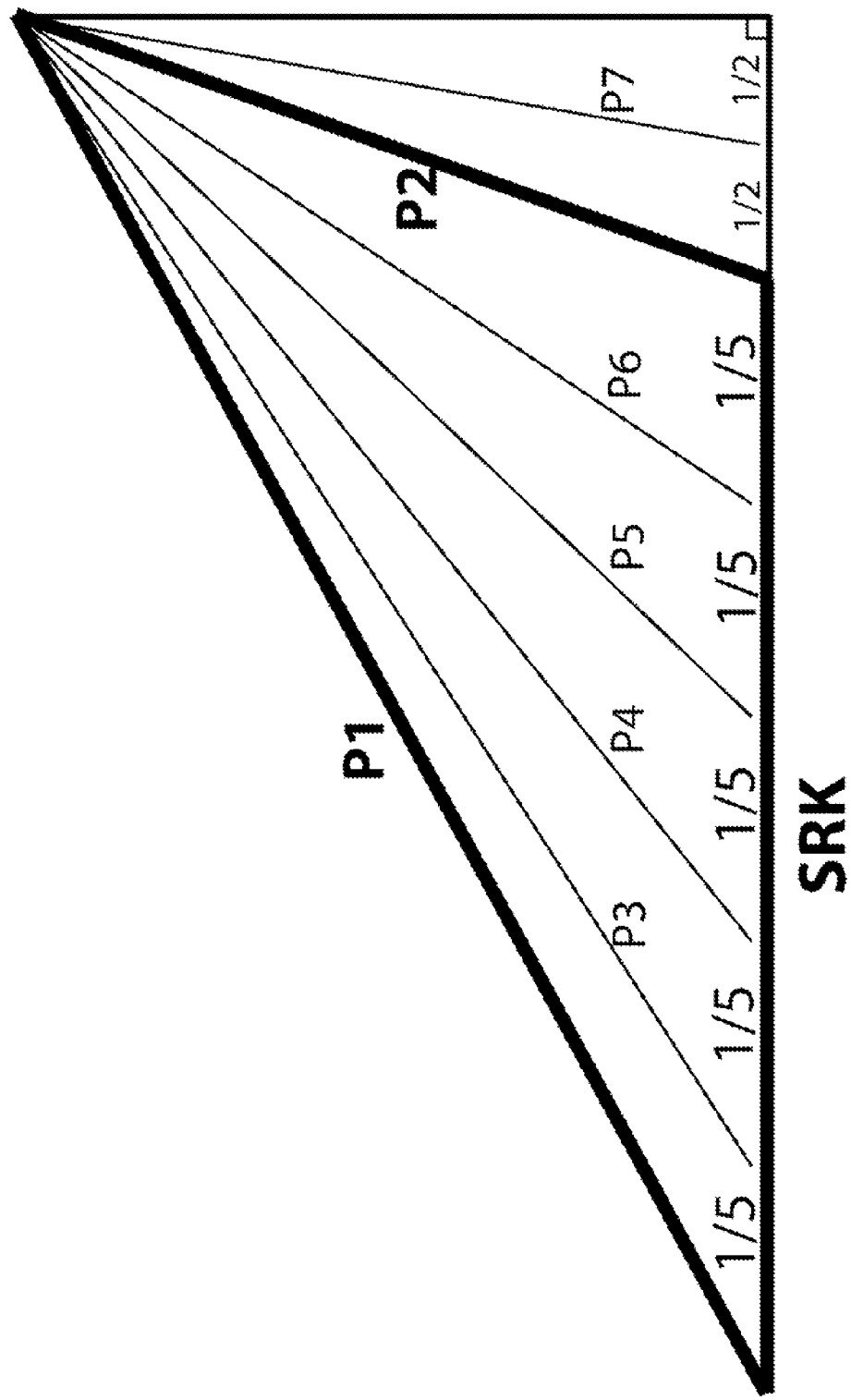
FIG. 8 depicts one variation for "intra-triangular" vectors.

FIG. 8 shows another variation for computing candidate vectors. In an embodiment, one of the sides of the triangle formed by SRK, P1, and P2 can be sectioned into thirds or quarters and then a vector is drawn from the opposite vertex. These additional vectors can be converted to prime numbers according to methods of the invention described herein. In an alternative embodiment, either or both of the other two sides of the triangle could also be sectioned to define additional prime numbers. These constructions are simple and "intra-triangular" vectors. The geometry can also be extended to yield still more prime numbers through an "extra-triangular" expansion.

In the "extra-triangular" form, each face of the basic UCF three-dimensional geometry can become a base for a new pyramid—generating three new pyramids and thus nine new prime numbers. Then each face of each of those three pyramids (nine faces) then can be extended into a new pyramid and so on.

At each "layer" of new pyramids, the height of the altitude of the pyramid can be the Pa value, the (Pa*pka) value, or using a function that depends on the layer level, decreased or increased, thus further varying the pyramids at each successive outward layer of pyramids. This is an optional implementation value. If no "altitude adjuster" is used, then the altitude at all exterior pyramids can be the same as the first level or simply computed from the base of that particular pyramid just as it was in the first pyramid.

The primary advantage of this method over the intra-triangular one is variation. The intra-triangular form generates prime numbers that are bounded between the values of the two sides bordering the vertex origin of the prime vectors. In this extra-triangular form, there is a much wider range of prime values generated which increases diversity and thus entropy of prime numbers and thus secrecy. For example, adding (or moving "up") just three levels of pyramids would yield an aggregate of 122 prime numbers all of which could be layered into the MIRP-Stack. In an embodiment, the base level (zero) can be viewed as the base pyramid. Moving up one level would mean that the three faces of that base level pyramid can form the bases of three new pyramids. Moving up two levels would mean those three new pyramids further have new pyramids built on their faces (9 faces=9 new pyramids). Up three levels would mean add 27 new pyramids on the 27 faces of the level 2 pyramids. The value of increasing the number of prime numbers is primarily security (increased difficulty of cryptanalysis), as well as expansion of the OTP length.

Figure 9:
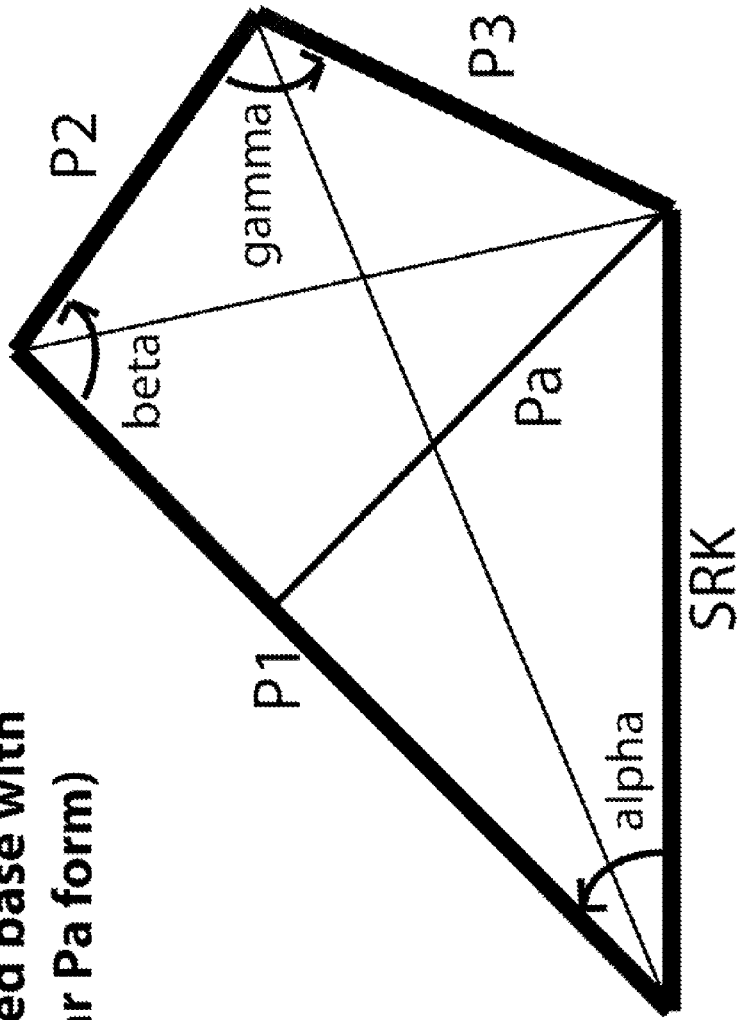
FIG. 9 depicts an embodiment of the UberCrypt Geometry, 2-D view, showing a four-sided (vs three-sided) polygonal base as the foundation for a multi-dimensional geometric form suitable for use.
Figure 10:
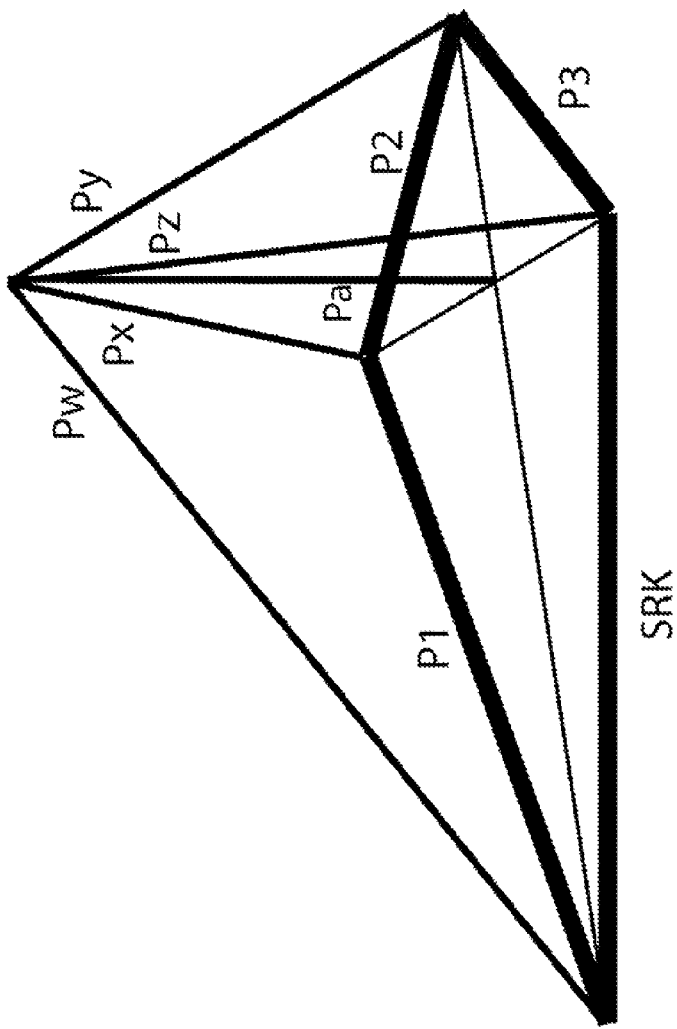
FIG. 10 depicts an embodiment of the UberCrypt Geometry, 3-D view, showing a four-sided (vs three-sided) polygonal based pyramid as the foundation for a multi-dimensional geometric form suitable for use.

Furthermore, the UberCrypt geometry is not limited to a three sided figure as a base. In alternative embodiments, the base could also be a four-sided, five-sided, six-sided or n-sided geometry with a single or multiple tent poles erected with pyramid edges constructed from the base vertices to the tent pole(s) top(s). Refer to FIG. 9 and FIG. 10 for an example of a four-sided base. In this form, the base consists of the SRK and P1, P2 and P3 (three prime numbers) plus the Vector Pa as tent pole from which the Pw, Px, Py and Pz prime numbers are found for a total of seven prime numbers to act as seeds to the pseudo-random number generator.

Also, in this embodiment, five secret keys consist of the SRK, the Alpha and Beta angles, as well as the multipliers of SRK to generate the P1 and P2 vectors. The final Gamma angle and P3 candidate vector are computed from the geometry. As with the three-sided form, the fractional (pka) value of Pa is computed upon each encryption and the third-dimension P(n) prime numbers are dynamically computed.

Clearly there is no theoretical limit to the number of sides in the base. With each increase in the number of sides in the base, there is an increasing number of prime numbers (and thus MIRP Layers) generated which increases difficulty for the cryptanalyst trying to crack any particular encryption.

Figure 11:
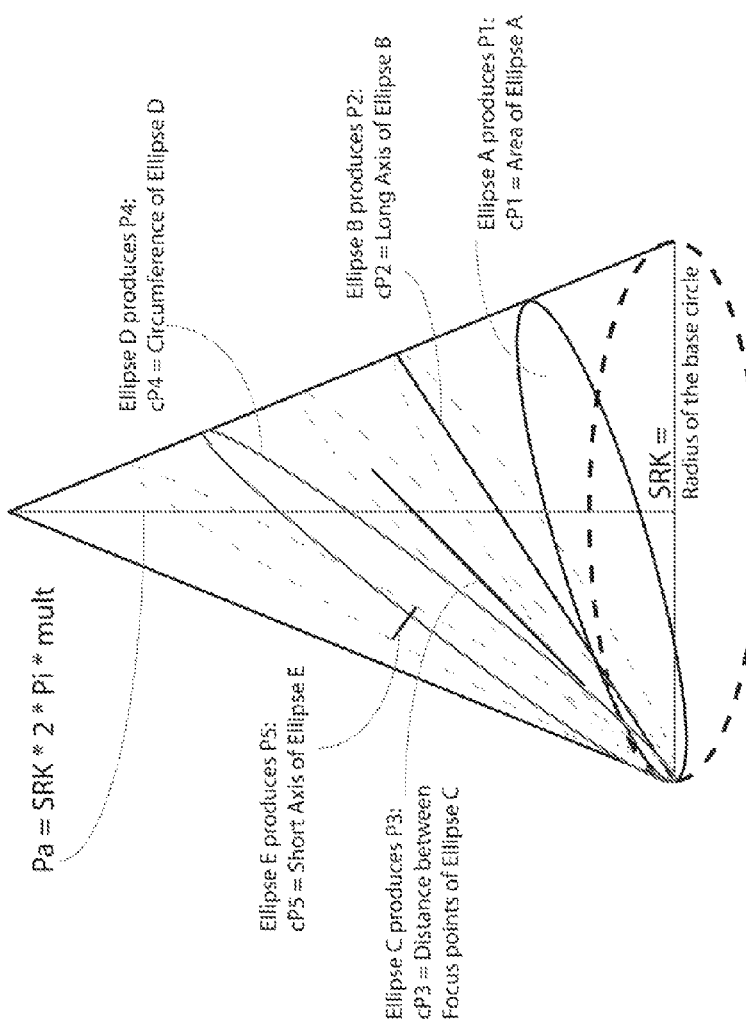
FIG. 11 depicts an embodiment of the UberCrypt Geometry for a cone showing another general multi-dimensional geometric form suitable for use in this invention.

The UberCrypt Geometry is also not limited to straight-line geometry. The general geometric form could also be a cone (see FIG. 11) or any other multi-dimensional geometric form. This choice is up to the implementer.

There are alternative spherical embodiments as well. Again, the UberCrypt Framework is just that: a Framework. Whatever geometry one can imagine (including, in various embodiments, a torus or a prism), provided that two or more parties can agree on the geometry and the known characteristics that will be used to determine the candidate prime numbers—that geometric framework can be used for key derivation.

The UCF multi-dimensional Geometry, thus remains intact and all the subsequent operations to generate the key stream (OTP) remain the same. Whatever the general geometric form chosen, by changing just a few variables (the "tent pole" or placement for example) the computation of the $3^{rd}$ dimension prime numbers can vary dramatically from one implementation to the next. The key point is that there are no "extraordinary manipulations" required of any system implementing an embodiment of the invention—it all remains a natural part of the UC Framework.

The Mathematics

In an embodiment, a system practicing the UCF invention disclosed herein could use three mathematical processes to construct or synchronize the UCF three-dimensional geometry:

1) Construction of SRK and 'candidate' values
2) Use of candidate values to define final private prime numbers, and from them, public keys
3) Use of public keys, in concert with SRK, to reconstruct the private prime numbers In an embodiment, the SRK and 'candidate' values could be constructed as follows:

1) Generate SRK (this is only one form—any form is acceptable provided that it produces an integer between within a range acceptable for the security requirements and computational limitations at hand):
   a. Collect UTC timestamp (with milliseconds) in ISO format as a string
   b. Add "salt" to this string. This salt is a random number between 10,000,000 and 99,999,999 where the random seed is the result of step a. As is well known in the art, salt is a technique for adding entropy/randomness to a process.
   c. Generate SHA256 with step b as input (32 byte digest as output)
   d. Convert result c to base 10 integer.
   e. Find (NHP) Next Highest Prime above result d (assuming d is not prime)
   f. Convert NHP to MIRP using any appropriate method including, without limitation, the method discussed beginning at paragraph [000112] with a length of 9903 base 10 digits (equal to $2^{32768}+2^{128}$)
   g. Generate a random number (using seed from step 1 again) between 77 and 9903 and use that length (right side) from the result of step f
   h. Trim any leading zero's and this is the SRK.
2) Generate candidate P1 that satisfies the "obtuse triangle" requirement:
   a. Use random function to generate the angle "alpha" (in degrees not radians) between 15.000000000000000000 and 74.999999999999999999 inclusive. This numeric range represents a range of $2^{66}$ values.
   b. Calculate the minimum length of P1 that ensures that the P2 value is outside the perimeter of a circle of radius SRK. This ensures that the triangle is an obtuse scalene triangle. This value must be greater than the integer value of: (SRK/Cos(alpha))+1.
   c. Loop the following steps as often as necessary to generate a candidate P1 that is greater than the value from step {2.b}:
      i. Use random function to generate a multiplier value (64 bit float) between 2 and 65535.
      ii. Multiply SRK by the multiplier. Drop mantissa from that product to trim to lowest integer—this is the cP1. (candidate prime: cP1)
3) Generate candidate h:
   a. Compute candidate h using:

$ch = cP1 * sin(alpha)$  i.

4) Generate candidate b:
   a. Using trigonometry:

$cb = (cP1 * cos(alpha)) - SRK$  i.

5) Generate candidate cP2:
   a. Employ the Pythagorean formula using cb and ch:

$cP2 = Integer\ of: \sqrt{ch^2 + cb^2}$  i.

In an embodiment, candidate values can be used to define final private prime numbers, and from them, public keys:

With SRK now known, and candidates for P1, P2, we exercise the prime number generator to locate the final P1 by generating prime numbers between cP1 and cP1+10000. Select the first prime (Next Highest Prime or NHP) that is equal to or greater than cP1.

This step is repeated for cP2.

The final three sides of the UberCrypt triangle are now known: SRK, P1 and P2. These are then used to generate the public keys 'pkb' and 'pkh' as follows:

1) With the lengths of the three sides of this irregular triangle now final, employ Heron's Formula to determine the area of this non-right triangle (obtuse scalene):

Semiperimeter $'s' = (SRK+P1+P2)/2$  a.

Heron's formula:  b.

$Area = \sqrt{(s*(s-P1)*(s-P2)*(s-SRK))}$  i.

2) With the area, determine the height of the triangle:

$h = (2*Area)/P2$  a.

3) Having h and P1, employ the Pythagorean formula to find the adjacent side (SRK+b):

$b = \sqrt{(P1^2 - h^2)} - SRK$  a.

4) Generate public keys 'pkb' and 'pkh' (each will be a decimal value of a predetermined precision):

$pkb = (b/SRK)$  a.

$pkh = ((SRK+b)*h)/(\pi*SRK^2)$  b.

(this is the ratio of the area of rectangle 360 in FIG. 3b to the area of circle 370 in FIG. 3b)

5) Generate the Vector Pa from the geometry using whichever Pa method the implementer chooses (in this case example, the altitude of the triangle whose base is P1). The Pa is the basis for the so-called "tent pole The Pa is multiplied by the pka public key to get the actual height of the tent pole. The pka key is dynamic. That is to say, it is generated at random upon every encryption and passed in the encryption header as a public key. It can be a percentage representation of the Pa. So, 0<pka<1 can represent the proportion of Pa. Both parties must be able to compute the Pa which is derived from the base triangle itself.

$cPa = (2+Area\ of\ the\ triangle)/P1$ (keeping only the integer portion and discarding the mantissa)  a.

$Pa = NHP$ that is $>= cPa$.  b.

6) Generate pka with a simple random generator function seeking a value such that:

$[0.15000000 <= pka <= 0.94999999$ ($2^{27}$ bits of freedom)]  a.

Again, a reminder that pkb (directly) and pkh (indirectly) are relative to the length of SRK. So, an interceptor of values pkb and pkh cannot determine P1 and P2 without the value of SRK which is held in secret. Furthermore, the pka value is a number relative to Pa which is not known without SRK, P1 and P2.

In an embodiment, the third dimension private prime numbers can be constructed from the pka public key:

Once the SRK, P1 and P2 values are known and the Pa is computed (all static values) then upon each encryption the encryptor randomly generates the pka public key which is shared in the header of the encrypted file/stream. The encryptor (and subsequently the decryptor) must compute the Px, Py and Pz values from the edges of the pyramid formed by the base triangle (SRK-P1-P2) and the altitude formed by (pka*Pa). All of this is done with trigonometry/geometry so it is very straightforward. In an embodiment, the steps can include:
   1. Calculate Px:
      a. Compute the base of the vertical triangle ending at Vertex 1:

$m1 = (\frac{2}{3})*4((b+SRK*\frac{1}{2})^2 + h^2)$  i.

b. Now having the base of the triangle known—and the height is already known to be (pka*Pa), the edge is simply Pythagorean math:

$cPx = \sqrt{(m1^2 + (pka*Pa)^2)}$  i.

c. Having the candidate Px (namely: cPx) seek and find the next prime number that satisfies: cPx<=Px 2. Calculate Py:
  a. Compute the base of the vertical triangle ending at Vertex 3. Extend the geometry (refer to FIG. 2) to create a right triangle from which we can derive the length of the medial vector.

$by = (2 + \text{Area of the triangle})/P2$  i.

$by = \sqrt{((\sqrt{(P1^2 - hy^2)} - P2 + (P2/2))^2 - hy^2)}$  ii.

$m3 = (\tfrac{2}{3})*\sqrt{((by + P2*(\tfrac{1}{2}))^2 + hy^2)}$  iii.

$cPy = \sqrt{(m3^2 + (pka*Pa)^2)}$  iv.

b. Having the candidate Py (cPy) seek and find the next prime number that satisfies:

$cPy <= Py$

3. Calculate Pz:
  a. Compute the base of the vertical triangle ending at Vertex 2. Compute the interior angle (degrees not radians) at Vertex 1 then compute the triangle base.

$Vert1 = 180 - \sin^{-1}(h/P1) - (180 - (90 - (\tan^{-1}(b/h))))$  i.

$bz = P2 - ((\tfrac{1}{2})*P1*\cos(Vert1))$  ii.

$hz = (\tfrac{1}{2})*P1*\sin(Veal)$  iii.

$m2 = (\tfrac{2}{3})*\sqrt{(bz^2 + hz^2)}$  iv.

$cPz = \sqrt{(m2^2 + (pka*Pa)^2)}$  v.

b. Having the candidate Pz (cPz) seek and find the next prime number that satisfies:

$cPz <= Pz$

Use of public keys, in concert with SRK, to reconstruct the private prime numbers (decryption):

Upon receipt of public keys pkb and pkh, any holder of the companion SRK can easily reconstruct P1 and P2 using the Pythagorean formula.

1) First reconstruct b and h $b = pkb*SRK$  a.

$h = ((\pi*SRK^2)*pkh)/(SRK + b)$  b.

2) Then the prime numbers:

$P1 = \text{Next Highest Prime of } \sqrt{(h^2 + (SRK + b)^2)}$  a.

$P2 = \text{Next Highest Prime of } \sqrt{(h^2 + b^2)}$  b.

3) Reconstructing Px, Py and Pz is exactly the same as shown for encryption. First the decryptor derives the Vector Pa (of whichever form it takes), then using that along with the public key: pka, they follow the exact same steps as the encryptor to compute the Px, Py and Pz values.

When this mathematical/geometric construction process is fully complete, a unique and discrete set of values is output. This list includes (intermediate values like by or by or m1, etc. are not shown):

SRK (Shared Relationship Key): a static value that is secretly held by all trust members in a trusted relationship.

pkb (public key b): a semi-static value (can change but usually doesn't) that is used to synchronize the "b" value in the two-dimensional Geometry.

pkh (public key h): a semi-static value (can change but usually doesn't) that is used to synchronize the "h" value in the two-dimensional Geometry.

pka (public key altitude—a randomly generated value): in an embodiment, an 8 or more digit integer that is converted to a zero base mantissa which, when multiplied by the Pa prime number, becomes the actual altitude of the pyramid.

h height of right triangle extension of [SRK/P1/P2]

b base of right triangle extension of [SRK/P1/P2]

The discrete and unique set of prime numbers (called the 'P-Stack'):

P1 (Prime #1): the longest side of the obtuse scalene triangle at angle "alpha" from the SRK side of the triangle.

P2 (Prime #2): the remaining side of the obtuse scalene triangle [SRK/P1/P2].

Pa (Prime Altitude): the prime number that represents the max altitude vector which forms the "tent pole" for pyramid (the third dimension).

Px (Prime x): the first edge of the pyramid.

Py (Prime y): the second edge of the pyramid.

Pz (Prime z): the third edge of the pyramid.

The PRNG Engine (OTP Generator)

The PRNG (Pseudo-Random Number Generator) Engine or OTP (One-Time-Pad) Generator employs a method for using a discrete set of sequenced prime numbers as an input—and processing that stack of prime numbers in a particular fashion to generate a key stream (OTP) with high speed, enormous length, and randomness of a very high quality.

A very rigorous and somewhat extensive series of randomness tests were conducted using the NIST Statistical Test Suite for measuring randomness. The Fourmilab Entropy test tool was also used. Here is a brief summary of the results:

a. The UCF had an overall success rate of 99.7% in the STS results. In fact, in the nine out of 3760 cases where the UCF had a failure in a test—on average—it failed just 0.25% short of passing.

b. The UCF scored an average entropy of 7.99999845 out of 8 (99.999981% of perfect entropy).

The PRNG

Converting the "P-Stack" (the discrete set of prime numbers) into an OTP is a fast process that involves a handful of steps. These are the steps in brief and each will be explained in greater detail.

Transforming a P-Stack into an OTP:

1) Transforming a prime number into a MIRP
2) Arrange MIRPs in a predetermined structure
3) Process the MIRP-Stack to produce key stream/OTP bytes.

Step 1) Convert prime number into a MIRP:

Irrational form:

$\sqrt{P}$ where P is a large prime number.

The UCF PRNG Engine leverages a very useful mathematical principle: square roots of prime numbers are irrational numbers. So, the UCF PRNG Engine can take a prime number and uses it to generate what is called a MIRP or the Mantissa of the Irrational Root of the Prime. In an embodiment, generation of a MIRP can involve not only creating an irrational number—but a transcendental one as well. This is preferred since a transcendental is non-algebraic and thus impossible to "reverse engineer" by attackers. However, this form is also more computationally expensive. In an alternative embodiment, irrational numbers only are used and the method can include the following steps (where the dimensions and sizes are provided for illustrative purposes only):

1) Compute the square root of the (base-10) prime to about 8000 (base-10) digits.
2) Subtract the integer portion of that result from the result, leaving only the mantissa.
3) Remove the "0." From the result of step 2. This leaves a sequence of base-10 digits on the order of 7990 or so digits.
4) Convert this very large number to a hexadecimal number of exactly 3001 bytes of length.

The resulting 3001 byte long hexadecimal string of values is a MIRP.

Here is an example. The prime number: 20255304726689764570334460224447 is converted using this process to its corresponding MIRP.

The square root of the prime is:
45005893754807008.13224422 . . . {7966 digits omitted} . . . 475083193

The leading integer portion (45005893754807008.) is then eliminated along with the decimal point, to leave only the mantissa. This mantissa alone is then converted to base 16 (hexadecimal) from base 10 (decimal) and left truncated at 3001 bytes. This resulting value is (first and last 10 bytes shown):

E5 85 8C 55 AF FF AB A7 35 59 . . . {2981 bytes omitted} . . . C6 8A 7E 0E B9 03 15 EA A9 B9

Consequently, each prime (P1, P2, Px, Py, PzRPn) is converted into such a sequence of values called a "MIRP".

In any case, these multiple MIRPs are layered or "stacked" in a predetermined arrangement and processed in a particular way—to generate the actual key stream. It is this particular form of generating these MIRP Layers, as well as the particular fashion of arranging them, and a very efficient method for processing them—that enable the near infinitely long cipher keys that are both random and non-repeating.

Transcendental Irrational Form

Instead of constructing a MIRP from √ which does produce an irrational, there is an alternative form for generating the MIRP that is also transcendental. This form is:

$$P^{(\sqrt{P}-int(\sqrt{P}))}$$

In this alternative, the prime number is raised to an irrational power.

This form is preferred because it is non-algebraic and thus impossible for a hacker to reverse from the MIRP (not that the MIRP is at all discoverable in the first place).

Step 2) Arrange MIRPs into a structure.

There are a plurality of structures or ways of arranging the MIRPs. These are both two dimensional and three dimensional in nature. Explained below is the simplest, but a highly effective and efficient method.

Figure 12:
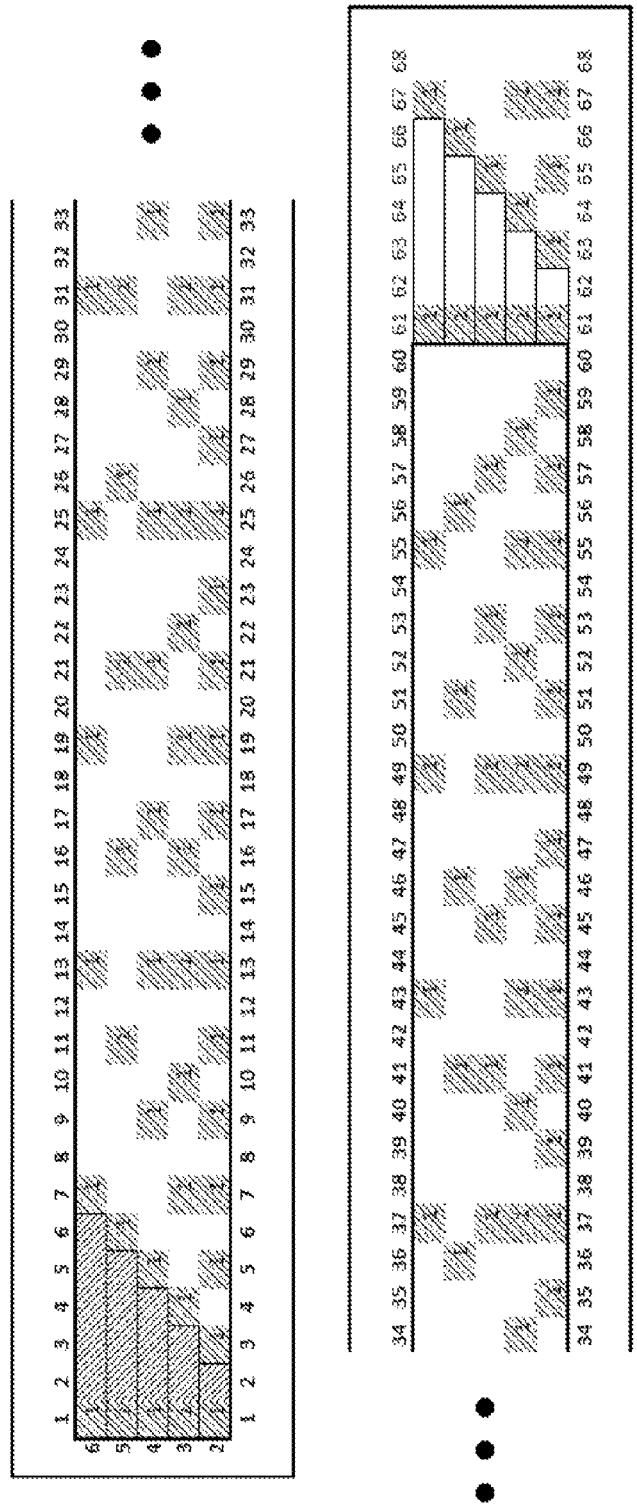
FIG. 12 illustrates a MIRP-Stack showing a 2-D arrangement of descending stack and descending length MIRPs.
Figure 13:
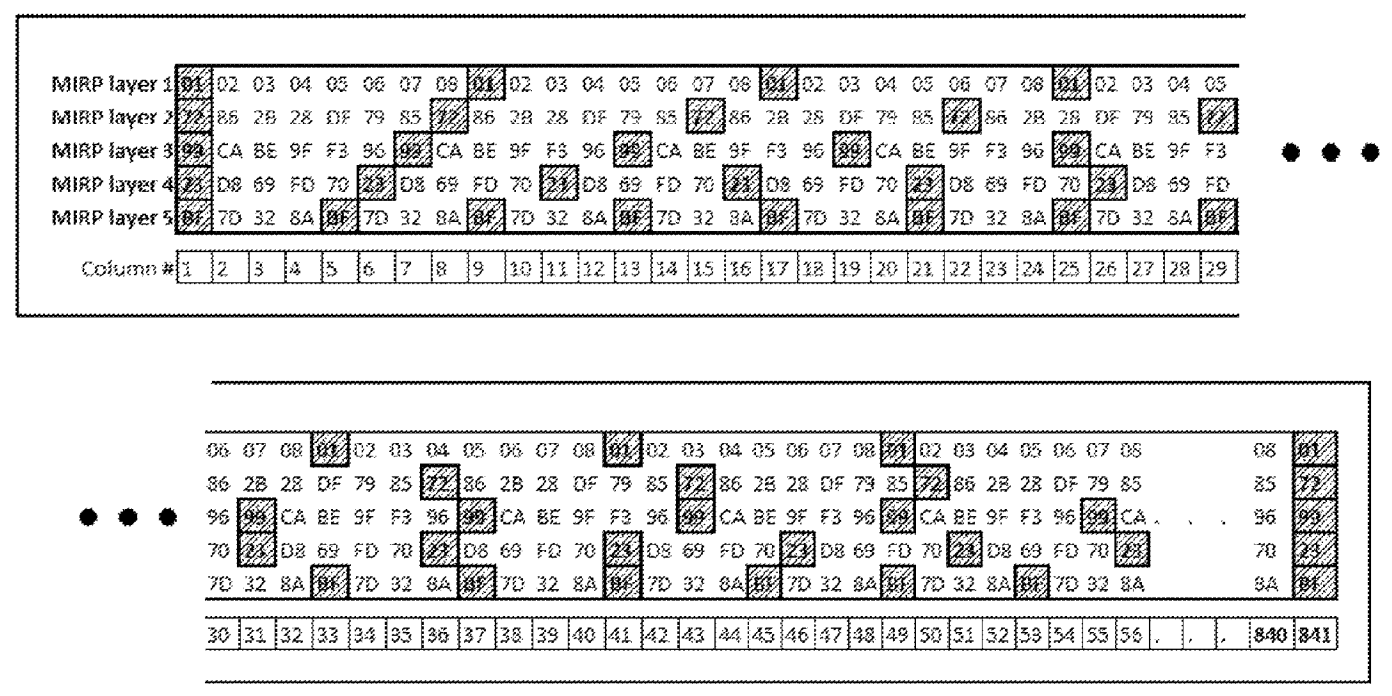

Referring to FIGS. 12 and 13, each prime can be converted to a MIRP, the MIRPs can be stacked with the first MIRP at the top, and subsequent MIRPs stacked below it (or, in an alternate implementation—above it). Each MIRP can then be made to repeat indefinitely within its layer. In this embodiment, the result is a matrix five (5) rows deep and of an indefinite length.

In FIG. 12, which is an example only, the top layer MIRP is six (6) bytes in length, the second layer is five (5) bytes and so on down to the fifth layer at two (2) bytes. In this illustration, only the first byte of each layer is shown as a "1" with a hatched background for clarity. As the illustration shows, this stacking in concert with the shortening of each layer—results in the sequence repeating at the sixty-first column of the matrix.

In FIG. 13, with some example data this time, the top layer is eight (8) bytes in length while the bottom is four (4). With this trivial increase from six as the top layer to eight, the total non-repeat period increases from 60 to 840, or a two-dimensional matrix of dimensions five by 840.

This non-repeat periodicity is a "Least Common Multiplier" (LCM) situation. Therefore to calculate the number of columns before the starting sequence does the first repeat—we must find the LCM for the MIRP lengths and layers used.

In this example embodiment, each MIRP is shortened by one byte (or alternatively, lengthened by one byte) before it is layered into the MIRP stack. The first MIRP is 3001 bytes long (then repeats indefinitely), the second MIRP is 3000 (and also repeats indefinitely) and the third is 2999 and so on. The reason for this will be explained in part in the next section "snaking" through the MIRP-Stack.

MIRPs are generated from prime numbers and those, as previously described, are derived from the geometric forms. However, as will be explained below, MIRPs and MIRP Layers can also come from non-geometric sources. One of those, for example, is time. In an embodiment, UTC time, by a particular process—is converted to a MIRP and becomes the top layer in the MIRP-Stack. Conventionally, a passphrase may also be used and, if so, is converted into two MIRPs and form layers two and three of the stack. Additional MIRPs and layers, as derived from the "extended authentication factors" can then be added to the stack after the geometric MIRPs.

Here is a summary of an order for the MIRP-Stack layers in an embodiment of the present invention:

| Layer # | Name Prime/ MIRP | Mandatory Preferred Optional | Description |
|---|---|---|---|
| 1 | T | P | Time is conventionally used as an input to the PRNG Engine. Time, like passphrase, is converted using a particular process - to generate a singular prime number/MIRP. |
| 2 | W1 | P | The passphrase, if used, is converted using a particular process into two MIRPs (prime numbers converted to MIRPs) This is the first password MIRP layer. |
| 3 | W2 | P | The passphrase, if used, is converted using a particular process into two MIRPs (prime numbers converted to MIRPs) This is the second password MIRP layer. |
| 4 | P1 | M | P1 is the prime number that represents the longest side of the base UCF two-dimensional Geometry. |
| 5 | P2 | M | P2 is the prime number that represents the third side of the base UCF two-dimensional Geometry. |
| 6 | Px | M | Px is the prime number that represents the edge of the pyramid running from the top of the pyramid to vertex 1 (angle between P1 and P2). |
| 7 | Py | M | Py is the prime number that represents the edge of the pyramid running from the top of the pyramid to vertex 3 (angle between P1 and SRK). |

| Layer # | Name Prime/ MIRP | Mandatory Preferred Optional | Description |
|---|---|---|---|
| 8 | Pz | M | Pz is the prime number that represents the edge of the pyramid running from the top of the pyramid to vertex 2 (angle between SRK and P2). |
| 9 | E1 | O | E1 is the prime number and associated MIRP layer that is the first "extended factor". This is typically a 'linked file'. See the Extended Factors section for more explanation. |
| 10 | E2 | O | Same as E1. |
| 11 | E3 | O | Same as E1. |
| ...n | N# | O | Other prime numbers as defined by the geometry/implementer. The literal physical limit to the number of MIRP-Stack layers is 3000 because the top layer is 3001 bytes long and each subsequent layer is one byte shorter - therefore there cannot be more than 3000 layers. However, the 3001 limit MAY be increased to allow for more layers. Keep in mind that because of the way the snaking XOR process works (two XORs only no matter how many layers there are) there actually isn't a performance or other practical limit to the number of layers an implementer may use. |

Step 3) Process the MIRP-Stack to produce key stream bytes.

Various methods exist for processing the MIRP-Stack to produce the random stream of bytes. One embodiment uses the "Snaking XOR" method while a second embodiment uses the "Bit Block Transposition" method. The "Snaking XOR" method is extremely fast and efficient and has produced randomness that is indistinguishable from truly random. The "Bit Block Transposition" method is slower, but offers some of the advantages of block ciphers for strength and produces eight times the number of OTP bytes as the "Snaking XOR" method.

The "Snaking XOR" method:

Once the MIRP-Stack is generated, there is a particular process for assembling the key stream. Computing each byte of the key stream is a simple process of using the bitwise operator of eXclusive OR (XOR). Next, selecting the bytes of the MIRP-Stack to XOR into the key stream byte can be explained with reference to FIG. 13 and FIG. 14. In FIG. 13, MIRP layer 1 is shown at the top and shows a length of 8 bytes of values linear from 01 to 08, repeating. All the layers are repeating lengths of the MIRP in that layer. In layer 2, there are a string of bytes beginning with 72, then 86, 2B, 28, DF, 79 and 85, before repeating. Note that the MIRP in layer 2 is one byte shorter than layer 1. Again, note that the repeating periodicity for this example arrangement is 840 columns. FIG. 14 then shows an example series of steps to produce ten bytes of key stream (OTP), from the first three columns of the example MIRP-Stack. In an embodiment, producing these pseudo-random values for use as an OTP can involve producing the first byte by performing a series of XOR operations on the bytes in that column, plus the first byte from the next column. The first byte is the only one produced this way.

Again referring to the FIG. 14 (all bytes in hexadecimal): this "01" in layer one, column one, is XOR'ed with the value below: 72. That result is then XOR'd with the 99 below, then that result with the 23, then that result with the 8F, and finally, a sixth byte (stack count +1) which is the 02 from the next column. The final result is a "74(hex)" which is the first byte of the key stream. With this first byte (74) in hand, the rest of the process can be thought of as a "snaking" of XOR operations.

The second and subsequent bytes of the key stream (OTP) involve a one byte "shift" and then a repeat of XOR's. More specifically, the first byte of the last sequence "01" is dropped and the next byte in the sequence "86" is added. So, in detail, the next sequence of byte values that are XOR'd are: 72, 99, 23, BF, 02 and 86. An XOR sequence of these bytes yields a F3.

However, it is important to note that it is possible to reach the same value by holding the last key stream byte (74) and XOR the new byte coming on the snake (86) and XOR the byte going off the snake (01) and the result is the same: (F3). Process the next byte of key stream both ways again: full snake: 99 xor 23 xor BF xor 02 xor 86 xor CA=4B. Short form (head/tail only): F3 xor 72 xor CA=4B.

In practice, therefore in a preferred embodiment, only two XOR operations are required to generate the next byte of the key stream no matter how many layers are in the MIRP-Stack. Consequently, the MIRP-Stack in an embodiment can be on the order of a thousand layers and the performance will be exactly the same as five layers.

This MIRP-Stack arrangement with a top layer MIRP length of 3001 bytes thus produces a string of pseudo-random byte values of extraordinary length (number of columns) before repeating. Then, in addition, by use of this "snaking" XOR process, each column yields the same number of key stream (OTP) bytes as there are layers. So, to compute the actual number of bytes of the OTP before it began to repeat— take the LCM for that number of layers and MIRP lengths— and multiply it by the number of layers in the stack.

The following table lists the OTP repeat periodicity for various embodiments having MIRP-Stacks of the indicated number of layers, where the top layer MIRP is of length 3001 bytes:

| Layers: | Bytes before repeating: |
|---|---|
| 5 | 202,162,612,537,485,000 |
| 6 | 181,703,756,148,691,518,000 |
| 7 | 126,980,641,588,577,255,829,000 |
| 8 | 72,415,245,888,800,057,895,624,000 |
| 9 | 243,831,184,813,325,894,941,802,961,000 |
| 10 | 101,325,403,466,870,983,009,149,230,460,000 |
| 11 | 111,123,569,982,117,407,066,133,961,045,482,000 |
| 12 | 1,558,598,988,283,727,457,435,582,913,267,376,808,000 |

The "Bit Block Transposition" Method

An embodiment illustrated by FIG. 15 also uses a "snaking" method—only with a consistent eight bytes regardless of the number of layers. In this method, eight bytes are chosen from the MIRP-Stack and an 8×8 bit matrix is assembled. This 8×8 matrix then can be transposed to yield 8 new 8-bit bytes. These new eight bytes may then be used as OTP bytes, or optionally, may also be XOR'd with the aggregate XOR of the original eight bytes to yield eight bytes that are different from both the original MIRP-Stack bytes and the Bit Block Transposition bytes.

The objective of the MIRP-Stack processing design is to ensure that the length of the key stream (OTP) used is a non-repeating random key of length greater than the length of the data being encrypted, and different for every encryption. The process for generating OTP bytes from the MIRP-Stack/Snaking XOR accomplishes this extraordinary length with a proven high quality of randomness and high efficiency. Recalling that for any encryption, only two layers of the MIRP-Stack are static: the P1 and P2 based MIRPs. All other layers: Px, Py and Pz based MIRPs are variables from the third dimension, as is time and potentially passphrase and extended authentication factors. This ensures not only a One Time Pad of sufficient length to never repeat for the length of the data being encrypted, and at a high quality of randomness, but also ensures that every OTP is unique and different and thus never used again.

This non-obvious method of transforming a geometry or an otherwise generated sequence of discrete prime numbers into a stream of values indistinguishable from random and of practical infinite non-repeating length has clear utility in cryptographic applications. It offers a form of One Time Pad use that has heretofore not been possible. However, it also enables business applications that previously depended on specialty hardware (atomic decay, photonic detector and other quantum-based devices) for random inputs. This both reduces cost and increases flexibility for those business applications.

The Ciphering Engine

The actual encryption process is extremely simple, particularly when contrasted with the complex s-box manipulations of block ciphers like AES and Blowfish. In an embodiment of the UCF, encryption can be performed in one low computational cost step. The actual ciphering step can consist solely of consuming one byte of plaintext and perform a bitwise XOR with a corresponding byte from the OTP.

Deciphering is also a very fast and easy single step in an embodiment. The UCF can consume the target byte of the encrypted data which is then XOR'd with the corresponding byte of the OTP and the original input byte is returned in plaintext.

Speed and Efficiency

Looking at the process from a slightly broader perspective, it is useful to include the OTP generation process as part of the ciphering process because this is done in real-time lock-step with the actual ciphering. In this embodiment, generating the corresponding byte of the OTP involves a single array pointer calculation and two XORs. Consequently, in total, to cipher or decipher, the entire work involved is an in-memory pointer calculation and three XORs. This is why the UCF is so extremely fast and efficient during encryption.

In order for this all to happen, the UCF must first generate the specific geometric form, the resulting prime numbers and MIRP stacks and arrange the MIRP stack for processing. However, in common desktop computers of the day, that entire process usually takes between a few hundredths of a second—to several seconds depending on the size of the SRK.

Extending the MIRP Stack and Automatic Generation of a Specific Geometric Form

As previously described, a semi-static specific geometric form can be shared in an embodiment of the present invention by two or more parties in a trust relationship. The two or more parties can synchronize the two dimensional aspect of the geometry through a key exchange involving initialization values for the geometry. From this static two-dimensional geometric form as a base—two prime numbers and thus two MIRP layers can be derived. The third dimension of this geometry can then change upon every encryption, based on the Vector Pa multiplier (pka) in order to yield additional prime numbers and thus MIRP layers for the PRNG.

However, any existing "trust-based" MIRP-Stack may be extended by additional layers that are not derived from the geometric form. For example, time and/or passphrases may augment the geometry to produce additional prime numbers and thus MIRPs/MIRP layers, and thus extend the length of the OTP and add entropy to the OTP.

Additionally, this method allows for an entire geometry (and subsequent MIRPs/MIRP layers/OTP) to be produced as an output of nothing more than a Passphrase or other input.

The Ad-Hoc use of the UCF:

The UCF has a provision for converting just a passphrase (or any factor) into the entire UCF three-dimensional geometry—thus allowing two or more parties to exchange encrypted data securely—without first having to establish a trust relationship. In such a scenario, the security is based on the shared secret passphrase or other authentication factor.

In the case where two or more parties want to secure communications, but are not part of a prior arranged trust relationship, a passphrase-only may be used. In an embodiment, this passphrase can be processed through a generation process and outputs a complete SRK+PStack and thus, MIRPs and OTP.

Using the example passphrase: u4H$11K#x4R_r4H$r8P;o0L~g4H*v6

1) UberCrypt produces a SHA256 (or SHA512 for more entropy/security) digest:
   4C7E18A8865659F7B2313FB2E35D5E606B6325B08EBACF3D1A8C087C135050 85

2) The digest is split into two equal length parts:
   a. Part 1: 4C7E18A8865659F7B2313FB2E35D5E60 hex
   b. Part 2: 6B6325B08EBACF3D1A8C087C13505085 hex 3) These two large integers are converted to prime numbers using the usual process (seek Next Highest Prime) and these are converted to MIRPs and may later be included in the MIRP Stack:
   a. W1: 101676057213566168454733042541192371831
   b. W2: 142742197375465594212366553667597258911

4) Next, using either or both of the above prime numbers, this method can further transform what began as a passphrase, into the three initialization values (SRK, Alpha and Multi) necessary to define a specific geometric form in three dimensions. Two methods are offered (others are acceptable).
   a. Method 1, the MIRP method: A very large integer is generated by XOR of the two halves of the digest. This integer is then converted to a prime via the usual NHP method. The prime is then converted to a MIRP via the usual method. A portion of an example MIRP: 9582197983773146381266870502963226536952472926366394044385573589187222921367415957898643215898457980890 58550110130411478748406 2290071276450
   b. Method 2, the Inverse method: taking the inverse of the decimal result of step 1 (at least 200 digits) with the integer portion removed. This string will be "parsed" for additional values.:

i. 1/34598569407821055000606916636342753760
   52710945620970637
   2098037590838314291333=89029291417450515
   02151631959923713106495222086619685341
   7412204721865557289436534392962828848222
   81807513255135008
   3787588389987923931859539633262702412576
   22965800300530460 2950538489242328268 . . .

5) From the integer string (by either Method 1 or 2 above), the SRK is parsed as the first 15 (or as desired by implementer) digits:
   a. 890292914174505150215163195992371310649522
      208661968534174122047
      218655572894365343929628288482228180751325
      5135008377875883899879
      239318595396332627024125762296580030053046
      029505384892423282689 50

6) Then parse the rest of this string looking for a valid angle (alpha) to use. Remember that the angle is conventionally between 15 and 74.9999999999 degrees. Fortunately, in this example, the next two digits are within the acceptable boundary.
   a. 890292914174505150215163195992371310649522
      208661968534174122047
      218655572894365343929628288482228180751325
      5135008377875883899879
      239318595396332627024125762296580030053046
      029505384892423282689 50
   b. becomes: 15.0215163195 degrees. Had the next two digits been 85 instead of 15, the method would skip the 8 and started at the next position, yielding a 50.215 . . . which would have been an acceptable angle. In bulk testing, this method never failed to find a valid angle and never had to skip more than 5 digits before it found a valid angle.

7) Next, the method finds the minimum acceptable value for a candidate P1 (oP1) based on the SRK and the angle and begins searching the string result from step two, beginning where it left off from the last step. What it searches for is a number that satisfies the boundaries of: oP1<cP1<=SRK*65535. In this case it finds:
   a. 8902929141745051502151631959 23 131 64
      522208661968534174122047
      218655572894365343929628288482228180751325
      5135008377875883899879
      239318595396332627024125762296580030053046
      029505384892423282689 50
   b. Which becomes 9923713106495222, which is not prime. Test it for validity (oP1<=cP1<=65535*SRK) which it satisfies. Then find the next highest integer that is prime, finding: 9923713106495257

8) From this point forward, construction of the rest of the geometry is the same as any other construction since the crucial elements of SRK, angle and P1 are now known. The additional prime numbers of P2 and Pa are calculated. Then, for pka, a value of 1 is chosen making the altitude of the pyramid equal to Pa. From this the additional prime numbers of Px, Py and Pz are also easily calculated to complete the three-dimensional Geometry.

The Extended Authentication Factors:

The UCF is an extensible framework and can incorporate, in various embodiments, any digitally representable data into the OTP Generation process. Each extended authentication factor thereby becomes, essentially, another key to decrypting the file or stream encrypted using that extended authentication factor.

These extended authentication factors can be layered into the OTP Generation process in such a fashion that each becomes a MIRP of its own placed in the MIRP-Stack. Every byte of the encryption changes because the new MIRP layer affects the entire PRNG processing. Therefore, adding a single Extended Factor will result in a totally new OTP with an additional 256 bits of input strength (assuming the hash used is SHA256), per factor.

Two examples of this are time and passphrase. In an embodiment, the implementer can access a UTC time source upon encryption and convert that string to a prime and then a MIRP and it becomes the first layer (3001 bytes) in the MIRP stack. In another embodiment, the UCF can also insert the passphrase used (whether Ad-Hoc or Trust mode) as two layers in the MIRP stack right below the Time MIRP layer.

In an embodiment, the extended authentication factor of time can be layered into the OTP Generation process as follows:

1) Begin with the UTC version of time, for example: '2011-11-30 02:47:02.721000'
2) Transform this to a number by removing all spaces and punctuation:
   20111130024702721000 (about $2^{64}$ bits of freedom)
3) Further transform this number by using the P1 value and a function such as modulo, for example: (P1 mod Time) or, by example:
   2025530472668976457033446022444747 modulo 20111130024702721000=4492139256403526747
4) Produce a digest (SHA256 or the like) of that value:
   SHA256(4492139256403526747)=
   d08c43ad79d4fc25e536de25d66ca9597c52963ef9
   c62888a9f3ce8f7e51cc4c
5) Convert that hexadecimal digest to a base-10 integer:
   94328898188294795192321209510782035671774718
   9990816694204895675343182 44449356
6) Transform this value to a prime number using the usual process (Next Highest Prime) yielding:
   94328898188294795192321209510782035671774718
   9990816694204895675343182 44449531
7) The implementer may then use the usual conversion process for transforming this prime number into a MIRP and adding it to the MIRP-Stack in the appropriate order and length.

It is important to note that this process (steps 4 thru 7) may be used for any extended authentication factor as well as time. It is also important to note that by using the calculation in step 3, which ties the extended factor to a secret value such as P1, the entropy of the factor is preserved as well as the security of it—thus making it possible to share the time, for example, in the header of an encrypted file or stream as a public key with complete security. Since any attacker could read the header and know the time of encryption—they do not know the P1 value and thus cannot reconstruct the MIRP that results from that public key value.

Extended authentication factors can be anything that has a digital representation. Here are just two examples:
1) "Linking" encryption of a file to the content of a completely different file. For example, let's say you are the CEO of a publicly traded Fortune 500 company and you are encrypting the Merger Agreement between your entity and another such entity. Naturally, you don't want this information to fall into either the hands of the press or your competitors, so you want to encrypt the agreement before emailing it to your peer CEO. You could use the UCF and establish a trust relationship with the other CEO. You could add a passphrase that you and this other CEO agreed upon by phone call. Still, you are concerned that the phone line could have been tapped or that someone has secured a copy of the trust keys you and the CEO exchanged. In this scenario, you can "link" the encryption to another file that you know only you and the other CEO have in your possession. Perhaps it is an Excel spreadsheet with the merged company pro-forma. Perhaps it is a copy of the executed non-disclosure agreement in PDF format. It could be any file you both have. Once you encrypt using this other file—the other CEO will not be able to decrypt the transmitted file without also linking to their identical linked file. So, an interceptor of the encrypted email, even with the passphrase and the secret keys cannot decrypt the file without first securing a copy of the linked file.

2) Imagine you are the CISO of a major bank with a prominent Internet presence and you are thus concerned about hackers breaching your systems and stealing data. You use the UCF to encrypt all PII (Personally Identifiable Information) about your clients/users. Perhaps you even go as far as to use the Split/Zipper feature of the UCF to split that data and keep each half in geo-disperse data centers each with their own security systems. This creates a pretty high bar for the would-be attacker. But, you're paranoid so you want to go that one more step. You could encrypt this data with one or more of the following Extended Factors any or all of which make the data useless "off premises" so even if a hacker breaches BOTH data centers to get both halves of the data—AND—they somehow manage to secure the encryption keys—these Extended Factors would prevent decryption:

a. The MAC address of the server that performed the encryption (meaning that the data can only be decrypted on a machine having the same MAC address.)
b. The GPS location of the server that performed the encryption (meaning that the decryption can only work when the computer is in the same physical location.)
c. The presence of a linked file that is somewhere behind the DMZ and known only to the encryptor.
d. A record of the traceroute between two specific servers in the two data centers that house the Split encrypted files.

Why are extended authentication factors important?

In various embodiments, extended authentication factors represent an extremely large and diverse number of digital elements that can act as authentication factors increasing entropy and non-repeat length of the OTP and adding additional bits of encryption strength for each factor used. Consequently, any attempt to decrypt this data, even with the correct keys and passphrase still fails as the 'hidden' extended authentication factors will not be discoverable by an attacker. In addition, because the cryptographic strength is conventionally measured in bits of input which is a combination of the size of the SRK (variable $2^{128}$ to $2^{32768}$),) the alpha input ($2^{64}$), the multiplier ($2^{64}$), time ($2^{64}$) and an unknown number (to the attacker) of extended authentication factors at $2^{256}$ each (up to 3000 of these)—the range of bits of input is $2^{320}$ to $2^{768320}$. While it is not likely or practical to use 3000 extended authentication factors, the point is the attacker has an essentially impossible computational force problem since the encrypted data is a result of an unknown (to the attacker) set of inputs each with their own number of bits of strength. However, to the decryptor, by virtue of the shared specific multi-dimensional geometric form and an agreed protocol for use of extended authentication factors—a secure exchange of data is effective and efficient.

One of the values of these Extended Factors can be called "self-combusting data". By using "environmental factors" as extended authentication factors, the encryptor can be sure to tie the decryption of the data to the very same environment (hardware and software) that did the encryption.

Splitting/Recombining Encryption:

In an embodiment, two (or more) encrypted files can be output from the encryption process. The bytes of the encrypted data can be split into two (or more) files. In this fashion an input file of exactly 1,000,000 bytes—could become two 500,000 byte encrypted files or four 250,000 bytes files, etc. This is the Split operation. Then, when decrypting, all of the split files and the matching geometry are required to recombine the halves and decrypt them back into their original file. This can provide considerable new security functionality.

To split an encrypted result, two bytes of plaintext and OTP are processed at a time; each byte of plaintext is XOR'd with a byte of OTP. Once two bytes are encrypted, the Most Significant Bits (MSB) of each of the two encrypted bytes are combined into a new byte. Then the Least Significant Bits (LSB) of each of the two encrypted bytes are combined into a new byte. FIG. 15 illustrates this split operation whereby two plaintext input hexadecimal bytes: "A3" and "18" are first encrypted (via XOR) using corresponding OTP bytes "C2" and "two-dimensional" to produce bytes "61" and "35". The MSB are thus "6" and "3" which are combined into the first output byte as "63" and the LSBs "1" and "5" are combined to produce the second output byte of "15". Each byte is then written to a separate file. If two files are chosen as output, then the first file always receives the MSB byte and the second the LSB byte. However, the implementer may allow for a higher rate of "diffusion" and spread these bytes across any number of files—or streams—in which case the output bytes are simply stored in sequence in file (or stream) 1 through (n) and then back to 1 again and repeat until the output bytes are exhausted.

Recombining, these split files/streams is simply a reverse operation. However, it is important to note that the same OTP is still necessary to both decrypt and recombine the split files.

FIG. 16 illustrates these steps. File one byte "63" is "split" into two halves "6" and "3" to become the MSBs of two different bytes and in that order. The second byte "15" is similarly split into "1" and "5" as the LSBs of the two bytes having MSBs of "6" and "3" respectively. Thus, two bytes are formed of values "61" and "35" which are, in fact, the two encrypted bytes. From this point, decryption is the normal process of XORing each byte with its corresponding OTP bytes: "C2" and "two-dimensional" to yield the original plaintext bytes of "A3" and "18".

Figure 18:
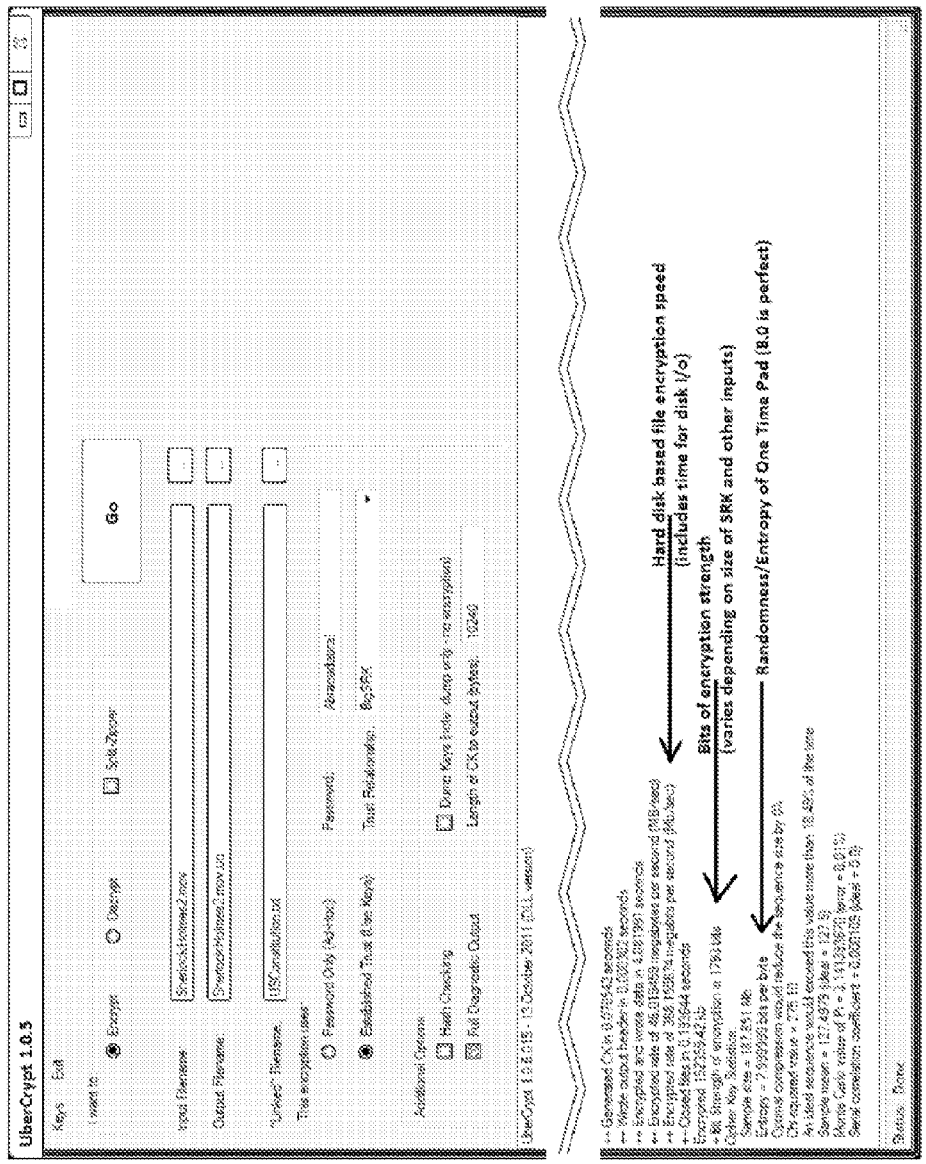
FIG. 18 depicts a screen capture of an embodiment of the invention implemented in software showing actual encryption output including performance and strength.

This invention has been successfully reduced to practice in computer software, written in the language of "C" for the Windows operating system and the Apple Macintosh OS X operating system. While still not yet fully optimized, performance is excellent and all encryption/decryptions tested (over 100,000 tests) have succeeded without failure. FIG. 18 shows the graphical user interface to this proof-of-concept reference code.

Those of skill in the art would understand that information and data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for generating a random sequence of bytes, implemented at least in part by a computing device, said method comprising:
    determining one or more prime numbers;
    for each prime number (i) determining an irrational root of the prime number, (ii) producing a mantissa of the irrational root of the prime number (MIRP), and (iii) generating a collection of MIRPs;
    determining at least one or more byte sequences formed from one or more of the MIRPs;
    creating a structure comprising (i) at least two dimensions, and (ii) the one or more byte sequences derived from a MIRP;
    generating the random sequence of bytes from the structure by executing a series of bitwise operations that (i) at least partially traverses the structure to yield a pseudo-random byte, (ii) are executed between individual bytes from each of the MIRPs, (iii) are based on one or more patterns, and (iv) are configured to increment byte positions in each of the MIRPs by a predetermined amount; and
    holding the pseudo-random byte as a last output byte and executing one of the series of bitwise operations on a first MIRP byte used as part of producing the last output byte and a second bitwise operation on another byte from another MIRP based on another pattern to yield another pseudo-random byte.

2. A method as in claim 1, further comprising:
    selecting an extended factor having at least one of an IP address, MAC address, or externally linked file, or any other digitally representable data.

3. A method as in claim 1, wherein the structure is a two-dimensional structure.

4. A method as in claim 1, wherein the structure is a three-dimensional structure.

5. A method as in claim 1, further comprising performing a length adjustment operation on the one or more irrational number sequences.

6. A method as in claim 5, wherein the length adjustment operation comprises decrementing each irrational number sequence by one or more values.

7. A method as in claim 5, wherein the length adjustment operation comprises incrementing each irrational number sequence by one or more values.

8. A method as in claim 1, wherein generating the random sequence of bytes from the structure comprises performing a series of predetermined bitwise operations in a predetermined order on one or more bytes in the structure.

9. A method as in claim 1, wherein the sequence of random bytes further comprises a one time pad.

10. A method as in claim 1, wherein the sequence of random bytes is used as a source of entropy.

11. A method as in claim 1, wherein the structure includes a vertically-arranged MIRP stack.

12. A method as in claim 11, wherein the series of bitwise operations executed between individual bytes from each of the MIRPs include a second byte from a MIRP that adjoins one of the individual bytes to yield the pseudo-random byte.

13. A method as in claim 3, wherein the one or more byte sequences derived from the MIRP may be extended by adding additional MIRPs derived from one or more extended factors.

14. A method as in claim 13, wherein the extended factors include at least one of a file stored on a computer storage medium, data stored temporarily in a computer memory or network buffer, contents of an Internet web page or other Internet connected media, a Media Access Card (MAC) address of a computer, an Internet Protocol (IP) address of a computer, an electronic representation of a Geospatial Positioning System location, or a serial number of a computing device or software.

15. A method as in claim 13, wherein the extended factors include digitally-represented data.

16. A method as in claim 1, further comprising:
    selecting an extended factor including digitally representable data.

* * * * *